(12) United States Patent
Newville et al.

(10) Patent No.: US 7,278,518 B2
(45) Date of Patent: Oct. 9, 2007

(54) INFORMATION DISTRIBUTION FOR USE IN AN ELEVATOR

(76) Inventors: Todd A. Newville, 61 Trowbridge La., Shrewsbury, MA (US) 01545; Shawn W. Duarte, 37 Lakefront St., Amherst, NH (US) 03031

( * ) Notice: Subject to any disclaimer, the term of this patent is extended or adjusted under 35 U.S.C. 154(b) by 313 days.

(21) Appl. No.: 10/800,107

(22) Filed: Mar. 12, 2004

(65) Prior Publication Data
US 2006/0144647 A1    Jul. 6, 2006

Related U.S. Application Data

(63) Continuation of application No. 10/083,669, filed on Feb. 26, 2002, now abandoned, which is a continuation of application No. 09/468,504, filed on Dec. 21, 1999, now Pat. No. 6,349,797.

(51) Int. Cl.
B66B 1/34      (2006.01)
(52) U.S. Cl. .................................... 187/396; 187/391
(58) Field of Classification Search ........ 187/391–397, 187/247, 414
See application file for complete search history.

(56) References Cited

U.S. PATENT DOCUMENTS

| | | | |
|---|---|---|---|
| 4,749,062 A | 6/1988 | Tsuji et al. | |
| 4,852,696 A | 8/1989 | Fukuda et al. | |
| 4,958,707 A | 9/1990 | Yoneda et al. | |
| 4,995,479 A | 2/1991 | Fujiwara et al. | |
| 5,010,472 A | 4/1991 | Yoneda et al. | |
| 5,042,620 A | 8/1991 | Yoneda et al. | |
| 5,056,629 A | 10/1991 | Tsuji et al. | |
| 5,485,897 A | 1/1996 | Matsumoto et al. | |
| 5,606,154 A | 2/1997 | Doigan et al. | |
| 5,844,181 A | 12/1998 | Amo et al. | |
| 5,913,040 A * | 6/1999 | Rakavy et al. | 709/232 |
| 5,955,710 A * | 9/1999 | DiFranza | 187/396 |
| 6,073,727 A | 6/2000 | DiFranza et al. | |
| 6,288,688 B1 * | 9/2001 | Hughes et al. | 345/2.2 |
| 6,622,826 B2 * | 9/2003 | Amo et al. | 187/391 |
| 6,988,071 B1 * | 1/2006 | Gazdzinski | 704/275 |

FOREIGN PATENT DOCUMENTS

| | | |
|---|---|---|
| JP | 4-125274 | 4/1992 |
| JP | 5-70050 | 3/1993 |

* cited by examiner

*Primary Examiner*—Jonathan Salata

(57) ABSTRACT

A method for displaying an image on a plurality of displays, each if which is in one of a plurality of elevator cabs. The method includes inspecting a playlist having first data leading to first information to be displayed; at least in part on the basis of the first data, retrieving the first information; assembling second data, the second data being representative of the image that includes the first information; and distributing the image to each display.

29 Claims, 25 Drawing Sheets

```
Real_time_control::
    <RT ID>, <URL>, <refresh period(minutes)>;
80  <RT ID>, <URL>, <refresh period(minutes)>;
    <RT ID>, <URL>, <refresh period(minutes)>;

play_information::
<time>::
<frame type>;
<ad format type>, <ad URL>;
<real time format type>;
<segment 1 URL>;
<segment 2 URL>;
<time>::
<frame type>;
<ad format type>, <ad URL>;
<ad format type>, <ad URL>;
<real time format type>,
<segment 1 URL>;
```
— 60

```
AMS,<message_name.htm>,<start_date>,<stop_date>
    AMS,bom_message1.htm,6/12/98,6/13/98        ──221
    AMS,bom_message2.htm,6/12/98,6/14/98
                      •
                      •
                      •
    LTS,<message2.htm>,<start_date>,<stop_date>
        LTS,bom_message2.htm,6/12/98,6/14/98
                      •
                      •
                      •
    PMS,<message3.htm>,<start_date>,<stop_date>
        PMS,bom_message2.htm,6/12/98,6/14/98
                      •
                      •
                      •
    SLP,<message4.htm>,<start_date>,<stop_date>
        SLP,bom_message2.htm,6/12/98,6/14/98
                      •
                      •
                      •
```

SCREEN CENTER INFORMATION FLOW DIAGRAM

INFORMATION DISTRIBUTION FOR USE IN AN ELEVATOR

This application is a continuation of U.S. Ser. No. 10/083,669, filed on Feb. 26, 2002 now abandoned, which is a continuation of U.S. Ser. No. 09/468,504, filed on Dec. 21, 1999, now issued as U.S. Pat. No. 6,349,797. The contents of all prior applications are incorporated herein by reference.

BACKGROUND OF THE INVENTION

This invention relates to providing information in an elevator and other such personnel transport vehicles.

The impetus for constructing skyscrapers and other high-rise structures lies in providing a more efficient use of real estate, particularly in urban areas where the value of real estate is at a premium. The primary mode of transportation in such structures is the elevator, particularly in buildings having many floors.

Visual information provided in an elevator is generally limited to floor information and passenger instructions in the event of emergency or if assistance is required. An elevator may also include a static placard posting the day's present and their locations.

SUMMARY OF THE INVENTION

This invention features a system for displaying video information to passengers of an elevator in accordance with a play list defining a sequence of messages. The video information messages can include combinations of digital advertising, "real-time" general information, as well as, building-related information.

In one aspect of the invention, the system includes an elevator display unit having a display monitor for displaying video information to the passengers, and a local server which, receives scheduling information associated with the video information over a data communication path and, in accordance with the scheduling information, generates a play list used to display at the elevator display unit.

In another aspect of the invention, a method of providing general information and commercial information within an elevator includes the steps of: a) providing to a local server, scheduling information associated with video information to be displayed; b) generating, from the scheduling information, a play list associated with the video information; and c) generating a display for viewing at the elevator display unit within the elevator, the video information at predetermined times in accordance with the scheduling information.

In yet another aspect, the invention is a method of providing video information to a display monitor within an elevator located in a building. The method includes receiving first data defining a category of video information, receiving second data, associated with the category of video information and defining at least one source of the video information; and retrieving from the source, over a data communications path and on the basis of the first data and the second data, the video information to be displayed on the monitor within the elevator. The invention also extends to a system for providing video information by this method.

By "video information", it is meant any combination of general, commercial, and building-related information. By "commercial information", it is meant any information relating to commerce and trade including advertisements. "General information" is used here to mean information of general interest, including news (recent happenings, sports, entertainment, etc.) and weather. General information can also include information associated with the building within which the elevator is a part, for example, 1) events associated with the building; 2) traffic; 3) transportation schedules (e.g., train/shuttle services). By "building-related information", it is meant that information specifically related to the particular building where the elevators transport residents, tenants, and visitors of the building. The building-related information may include certain types of commercial information, such as advertising for businesses within or local to the building (e.g., coffee, shop, parking, florist), as well as announcements by building management for available space within the building. The building-related information can also include forms of general information, particularly relevant to the building and its elevator passengers. For example, such information can include building activities (e.g., holiday events, fire alarm testing), public address/emergency messages, traffic information, and other information useful to the elevator's passengers. In general, the building-related information is less limited by the type of information, and more by its geography.

With this system, advertisers, online content providers, and building management/owners can interact with a specific, well-defined, and targeted audience in an elevator, a setting where passengers often feel uncomfortable being confined with complete strangers. Elevator passengers often seek ways to avoid making eye contact with fellow passengers during what feels like an endless, unnerving duration of time. Passengers no longer need to stare aimlessly at the floor or ceiling, but have an informative media resource to watch.

Occupants of high-rise office buildings are typically business people with understood interests and buying tendencies. These people are ideal recipients for targeted content and advertising. The system allows content providers (e.g., local and national news sources) and advertisers to selectively target audiences based on the demographics of a building, city, region, business segment, etc. Similarly, national, regional, and local online content providers are afforded an opportunity to provide elevator passengers with information of general interest. The system also provides building owners and managers the ability to provide video information particularly relevant and useful to tenants and visitors of their buildings.

Embodiments of these aspects of the invention may include one or more of the following features.

The local server receives the scheduling information from the production server over a data communication network (e.g., the Internet).

The system also includes a production server which generates scheduling information associated with the general and commercial information. Thus, the production server serves as a central distribution site where, among other things, the scheduling information (e.g., building play lists or scripts) are generated. The production server includes a production server database for storing building-related data, general information-related data, and commercial information-related data. This database includes, for example, building characterization data, as well as the addresses from where the general and commercial information can be retrieved over the data communication path.

The production server includes a scheduling module, which retrieves the data from the production server database and generates the scheduling information and a building loader interface through which data is passed between the production server and the local server. The building loader interface encrypts the data passed between the production server and the local server and authenticates that the local server is one associated with the system.

The production server includes a billing module, which generates documentation relating to the duration of time the general information and commercial information is displayed at elevator display unit. A database maintenance module is also included within the production server to update the production center database with information relating to elevator occupancy as a function of time.

The local server communicates with the elevator display unit via a local area network including local and general information databases and a scheduling information parser. General information and commercial information retrieved over the data communication path are cached in respective ones of the local and general information databases. The scheduling information parser generates a local building play list from the scheduling information retrieved from the production server.

The local area network includes an Ethernet path for connection to the elevator display unit. The elevator display unit further includes an occupancy detector for determining, at predetermined intervals, the number of occupants riding within a particular elevator.

Generating the elevator play list is performed with a graphical user interface.

For the BOM interface, the video information includes a text message (e.g., in HTML format) and the play list includes a start date on which the text message is displayed on the display monitor; an end date on which the text message is displayed on the display monitor; and a day segment indicating a portion of a day the text message is displayed on the display monitor.

The user interface is remote from said local server and communicates with said local server over a data communications path, such as the Internet, a dial-up modem, or a local area network. The play list is a building operations play list, with the video information and scheduling information for generating the building operations play list relating to building operations.

The local server further receives a production server play list from a production server, remote from said local server, over a data communication network, said production server play list associated with general and commercial information for display on the display unit. The local server includes a parser, which generates a local building play list from the production server play list and the building operations play.

Other features of the invention will be apparent from the following description and from the claims.

BRIEF DESCRIPTION OF THE DRAWINGS

FIG. 7 illustrates the format of a play list.

FIG. 14 illustrates the format of a BOM play list.

DESCRIPTION OF THE PREFERRED EMBODIMENTS

Figure 1:
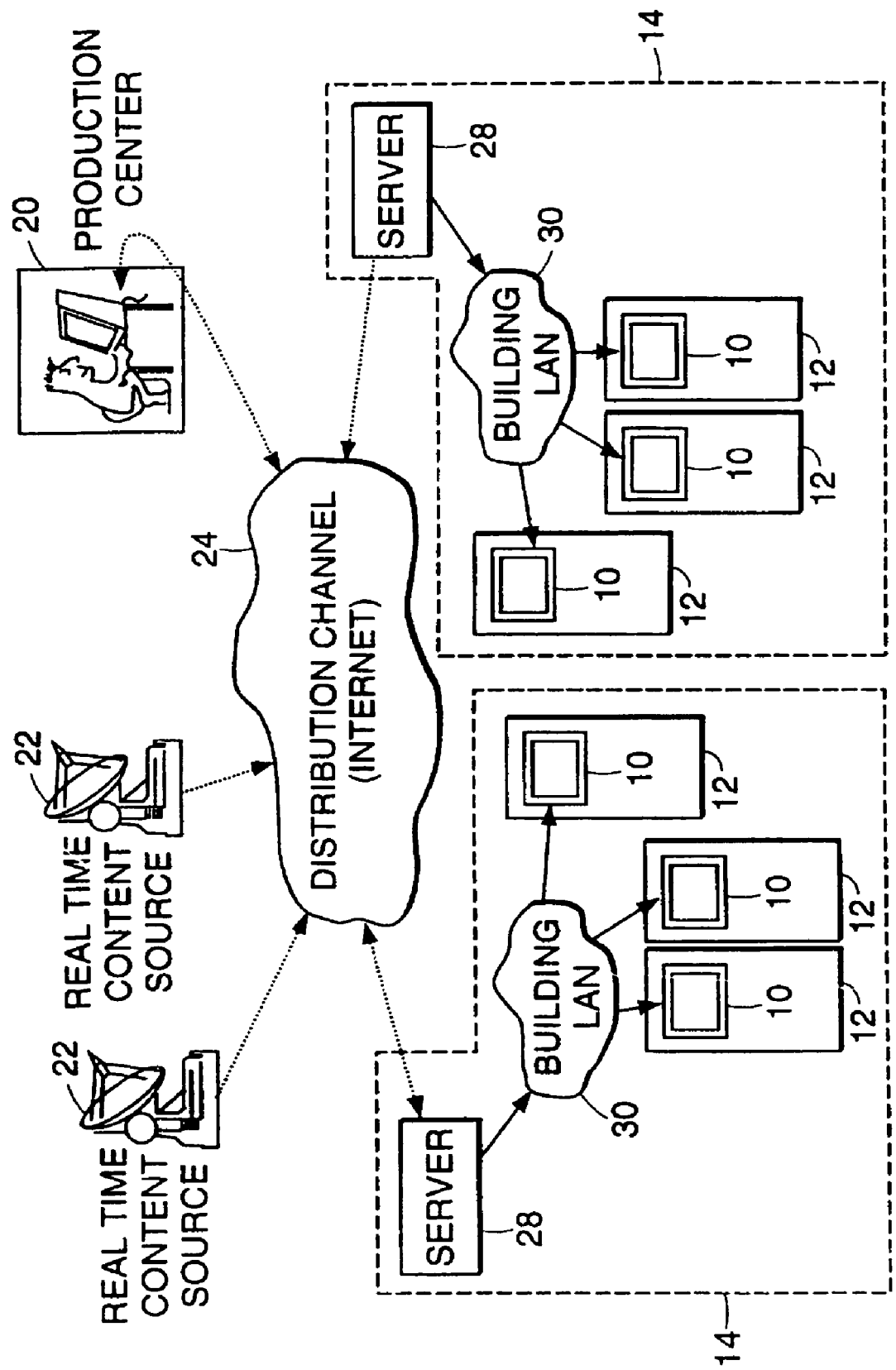
FIG. 1 is a block diagram of the information distribution system of the invention.

Referring to FIG. 1, an information distribution system 1 provides a media outlet for distributing general information along with digital advertising to elevator display units 10 mounted in elevators 12 of high rise office buildings 14 (represented by dashed-line boxes). System 1 includes a production center 20 which—among other important tasks described below—creates and distributes elevator display data by merging advertising with the "real time" general information. The general information is considered "real time" because the information is relatively current (refreshed at defined periodic intervals) with system 1 collecting, formatting, and displaying the information without human intervention. The general information is provided by any number of sources 22 (e.g., websites) connected via a distribution channel, here the Internet 24.

Each building 14 includes a building server 28 which interfaces with production center 20 via Internet 24 to develop presentations of merged advertising and general information to be exhibited on elevator display units. As is described in greater detail below, each building server provides the general and advertising information to each elevator display unit 10 of associated elevators 12 through a local area network (LAN) 30.

Information distribution system 1 utilizes a concept called "micro-demographics" which allows advertisers and online providers to target a highly desirable demographic, business population. The desired audience targeted by a particular advertiser or on-line provider may vary greatly and depend on a number of factors. As will be discussed below, system 1 collects or otherwise determines the demographics associated with a particular building as well as the occupants of that building. Thus, the geographical location and elevator traffic patterns of the building, and the nature of the business of the building occupants are determined by and stored at production center 20 so that a building script or play list 68 (FIG. 5) of advertisements and general ("real time") content can be matched to the building.

Figure 2:
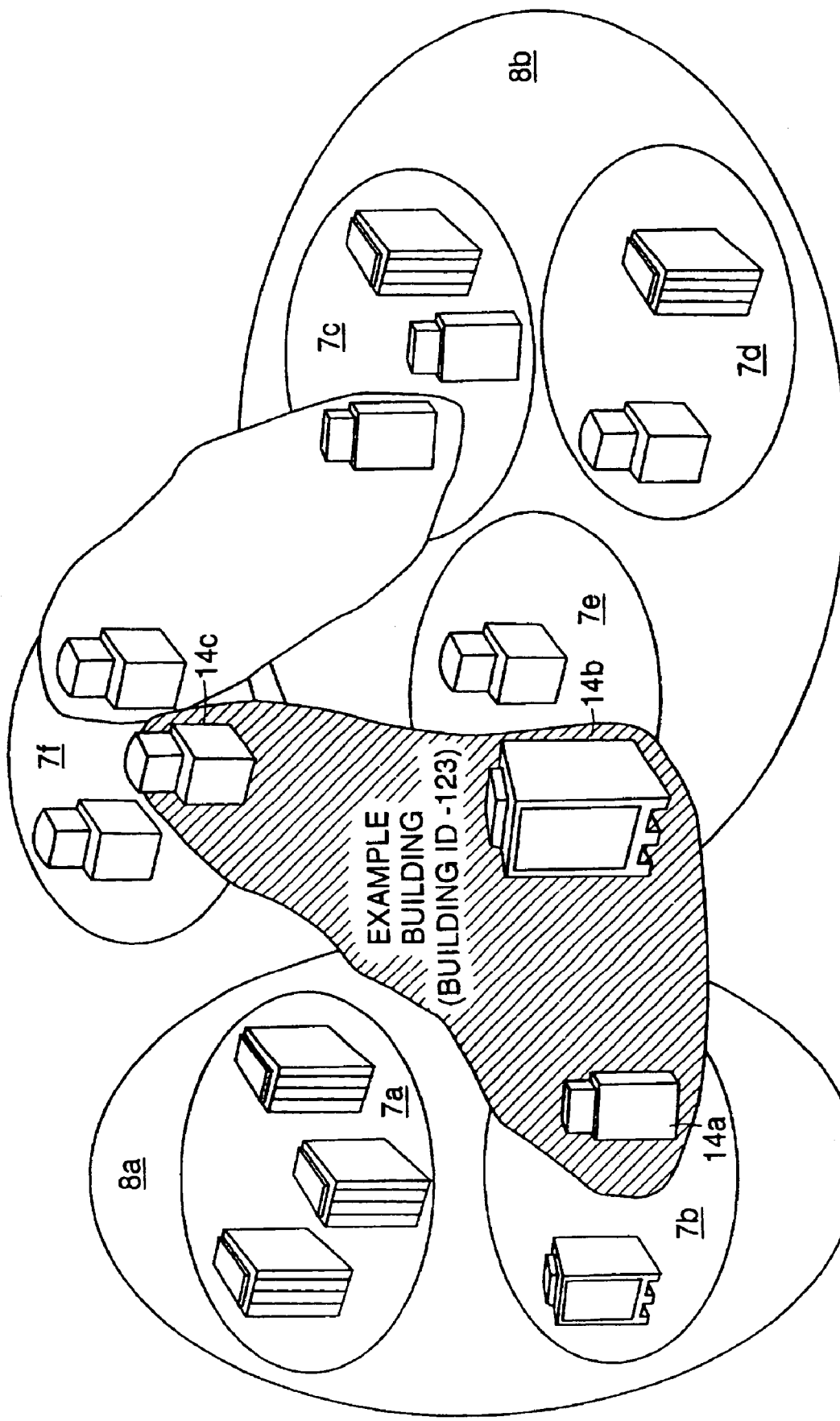
FIG. 2 illustrates the concept of micro-demographics.

Referring to FIG. 2, buildings 14 are shown encircled to represent that they belong to a particular geographical region. Smaller encircled groups 7a-7f represent, for example, buildings 14 within a city (e.g., Boston) are also shown encircled by larger geographical regions 8a-8b (e.g., New England). Geography is generally a very important demographic factor, however, as important may be the particular business segment which is targeted. Thus, several buildings 14a-14c which are from different geographical regions, but associated with the same business segment population (e.g., financial) may be grouped together (shown bounded by the cross hatched area). The ability to partition demographics by both geography and business segment provides tremendous value to content providers and advertisers.

In an example of one application of the system, assume an advertiser wishes to distribute an advertisement targeted specifically at the financial community in the northeast region of the United States. The advertisement needs to appear over a two week period during morning prime time hours. Production center 20 provides the advertiser with an automated request entry process for capturing this pertinent information representative of the target demographic. Production center 20 creates, from the target demographic, building play list 68 of potential building candidates for the advertisement and defines possible run time slots for when the advertisement is to be displayed. Several factors affecting which of a number of buildings are candidates and which time slots are available include: the target demographic (e.g., financial community in northeast United States), the number of advertisement impressions (i.e., the number of times an advertisement is viewed) purchased, the advertisement start and end dates (e.g., start and end of a two week period), prime time requirements (i.e., prime time morning), the advertisement format (280×90 animated GIF file) and advertisement locator (where GIF file is located). Once the advertisement time slots are identified, production center 20 determines the general information (e.g., news article, weather update) provided by an online provider that is to be merged and displayed with the advertisement. Building play list 68 specifies the format and content of the elevator displays for every instant of the day. Thus, in the example, production center 20 schedules the advertisement to be played at 9:00 a.m. and 15 seconds simultaneously with a local news article in one building play list while running the same advertisement at 8:15 a.m. and 0 seconds with a weather update in another building play list. It is important to note that building play list 68 defines what gets displayed and when, but does not contain the actual display content. Instead, building play list 68 provides pointers for obtaining the information over Internet 24.

With information relating to the advertisement imbedded in the building play list, production center 20 must then present the advertisement to elevator occupants. Building server 28 is responsible for downloading the building play list from production center 20, retrieving over Internet 24, the specified advertisement and general information, followed by assembling and distributing the advertisement and information within displays which are to be viewed in elevator display units 10. Building server 28 uses the pointers in play list 68 to retrieve the content and store it locally to a particular building 14. This allows building server 28 to create a very high performance broadcast channel within building 14. In the example, building server 28 uses an advertisement locator embedded in play list 68 to retrieve and store locally the animated GIF file for the advertisement. With the content stored locally, building server 28 reads play list 68, assembles displays at the times indicated by the list and distributes them to the individual elevators 12. Thus, in the example, at 9:00 a.m. and 15 seconds, building server 28 assembles the advertisement with the specified local news story and displays it in elevators 12.

Details relating to the major components of information distribution system 1 follow.

Figure 3:
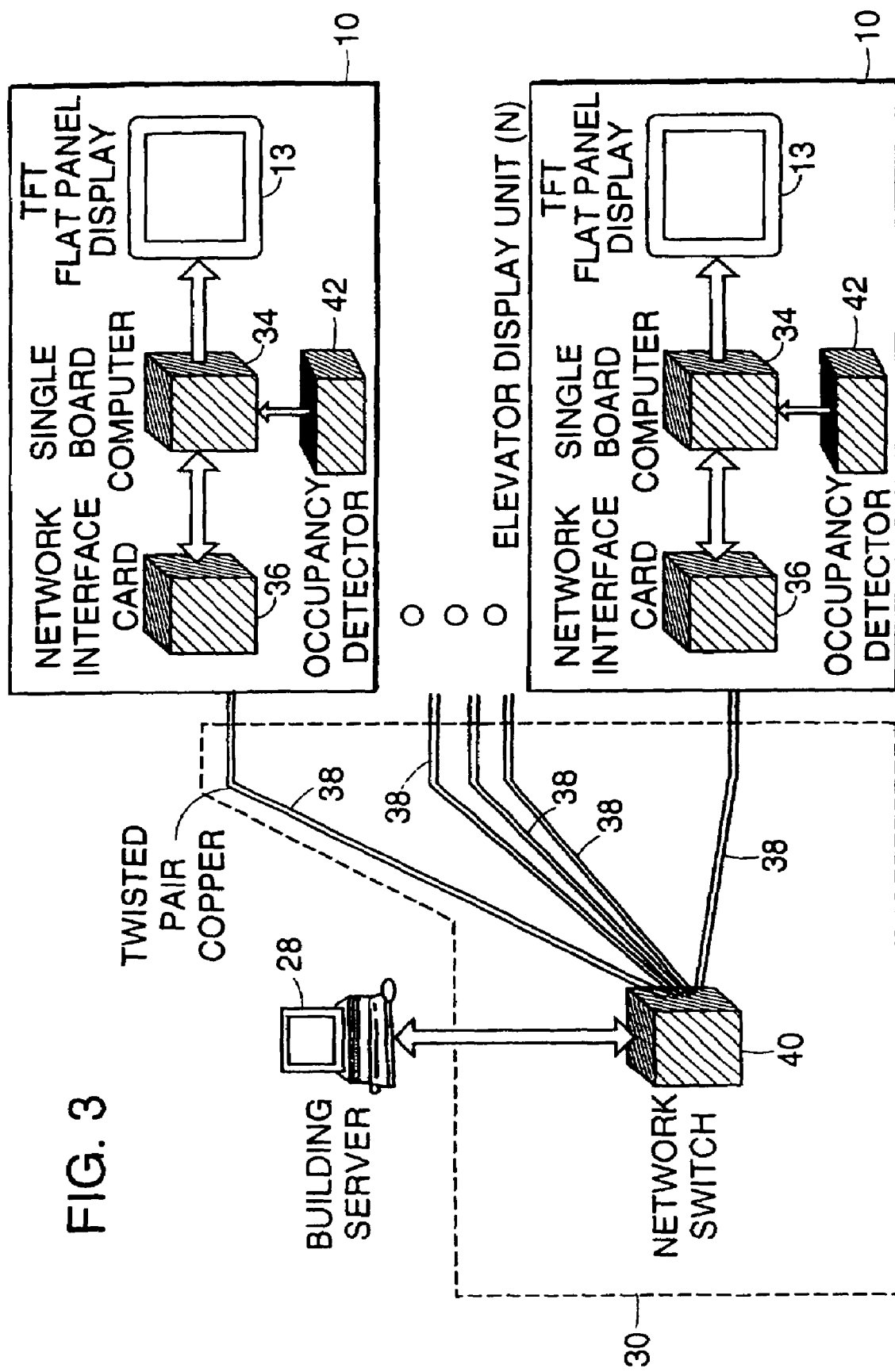
FIG. 3 is a block diagram of a building subsystem portion of the information distribution system of FIG. 1.

Referring to FIG. 3, elevator display unit (EDU) 10 receives and processes data provided by building server 28 to create display presentations. Elevator display unit 10 includes a display 13 controlled by a single-board computer 34 and a network interface card (NIC) 36. Display 13 includes an LCD controller, a back light assembly, a power converter, and a flat panel display (none shown). Computer 34 manages the operation of elevator display unit 10 including system setup and monitoring, network overhead, display data routing, and elevator occupancy. Network interface card 36 interacts with local area network 30 and is configured by computer 34 during system startup. Display data being broadcast downstream from building server 28 to elevator display units 10 represents the majority of the network traffic. In the downstream direction (from building server 28 to elevator display unit 10), network traffic is mostly comprised of display broadcast data. There is a limited amount of control information in the downstream direction, however this is negligible. Network interface card 36 routes display data directly to display 13. Control information will generate an interrupt to computer 34 to request service. In the upstream direction (from elevator display unit 10 to building server 28), network traffic includes occupancy information and system monitoring data. All upstream data is generated by computer 34 and passes to network interface card 36 for transmission.

Data from building server 28 is transmitted to each elevator display unit 10 via local area network 30 (shown enclosed by dashed lines). In particular, data is transmitted through copper twisted pair lines 38 via an Ethernet network switch 40 for managing data flow.

One important feature of system 5 not yet discussed, is its closed-loop nature. Advertising is measured based on impressions (i.e., the number of times an advertisement is viewed). To quantify the number of impressions delivered by system 1 requires system feedback which is generated using elevator occupancy measurements.

Figure 5:
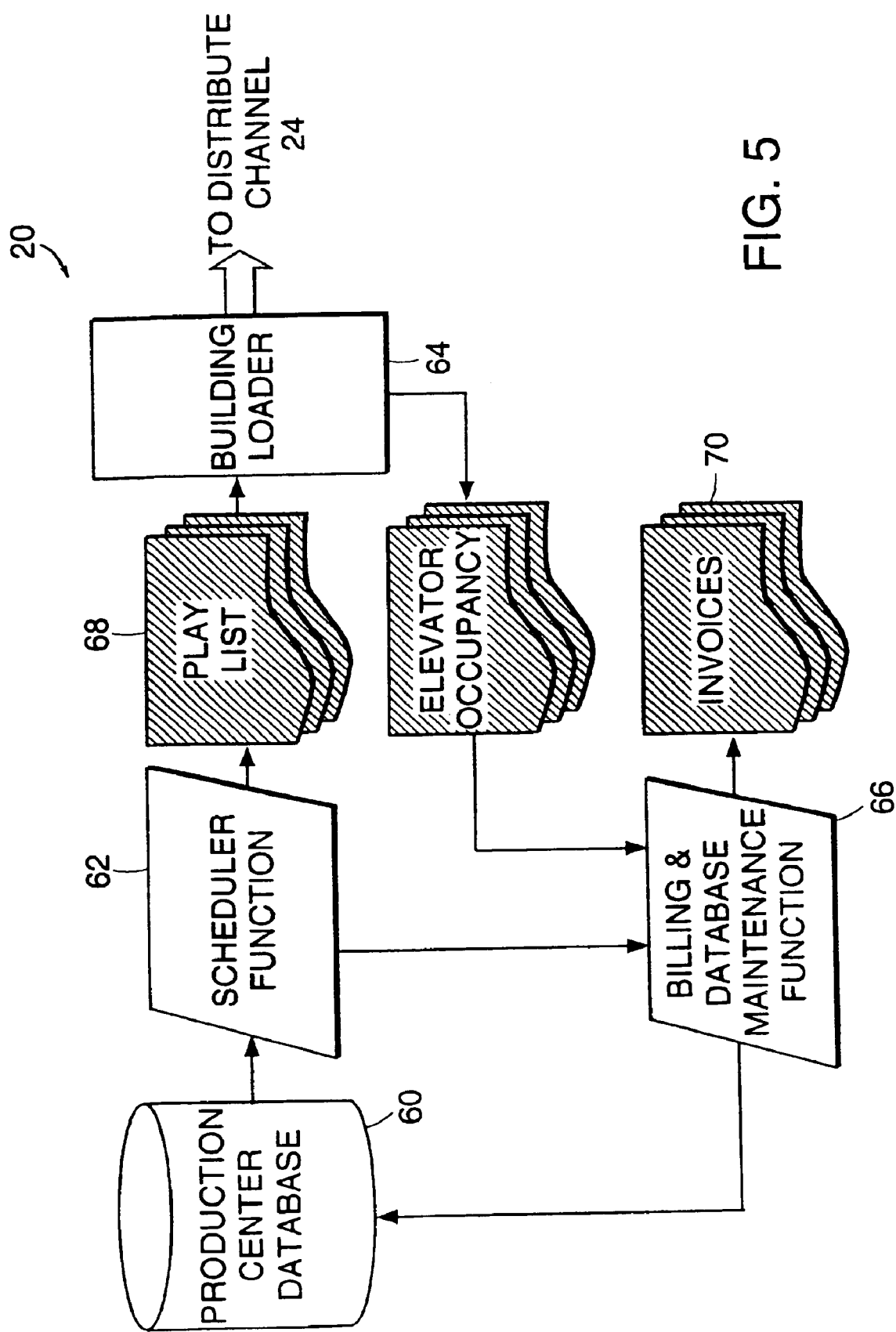
FIG. 5 is a block diagram of the production center of FIG. 1.

To provide feedback to system 1, each elevator display unit 10 includes an occupancy detector 42 for determining the number of occupants in a particular elevator throughout the day at predetermined time intervals (e.g., every 5 seconds). This information is summarized on a per building basis and uploaded via building server 28 to production center 20 once a day, typically during downtime periods. Production center 20 uses the feedback for billing and maintenance of a production center database 60 (FIG. 5). In particular, this feedback is used to update the advertisement impressions which are still to be displayed and for creating statistical traffic information for each building. This data is critical to the scheduling and advertisement sales process.

Occupancy detector 42 utilizes sensors (not shown) to generate a pair of pulses when a passenger enters or leaves the elevator. The sensors are, for example, imbedded in the elevator doors. The pulse characteristics of the sensors define whether the passenger is entering or departing the elevator. Occupancy detector 42 maintains an occupancy count based on these sensors. Computer 34 samples the occupancy count periodically. Each elevator display unit 10, therefore, generates a daily occupancy history which is used in the advertisement billing process.

Figure 4:
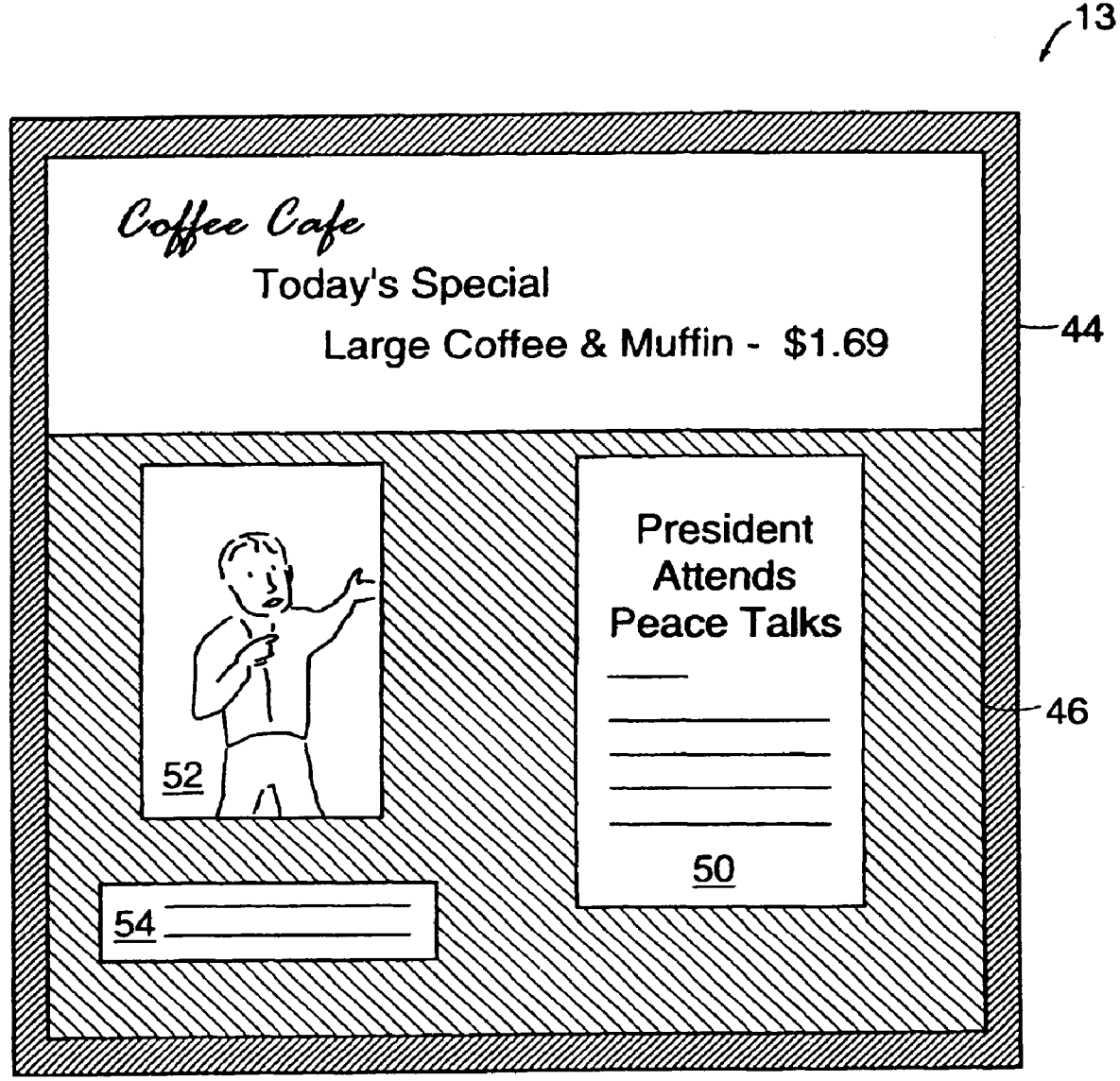
FIG. 4 is an example of a display screen of the display monitor of FIG. 3.

Referring to FIG. 4, under the control of building server 28, display 13 is segmented so that specific types of information are exhibited within particular regions of the display. Display 13 includes an advertising banner section 44 for displaying advertising and other commercial information and a "real time" content section 46 for viewing general information. "Real time" content section 48 may, in turn, be divided into other sections, for example, exhibit story excerpts 50, one or more pictures 52 related to the excerpt, and descriptions of the pictures 54. For example, as shown here, elevator passengers are provided, in banner section 44, the day's breakfast specials from a cafe located, for example, in the first level of building 14. Simultaneously, news text of general interest is displayed within a story excerpt 50 along with a related picture 54.

As stated above, a primary function of production center 20 is to create and distribute the elevator display data. Creation of the elevator display data includes merging of news, information, and advertising to produce the building-specific play lists 68. Distribution of the play lists is accomplished using the connectivity provided via Internet 24.

Another important function of production center 20 is management and maintenance of a website for system 1. The website provides management of building 14 and a central location where potential advertisers can request information relating to advertising on the system. Elevator occupants can also access the website for additional information relating to both the displayed "real time" information or advertising information viewed on display 13 in elevator 12. For example, an occupant may not remember details of a particular advertisement (e.g., today's specials at one of the building's dining facilities) or may want to learn more about breaking a news story displayed in "real time" content section 48.

Production Center

Referring to FIG. 5, production center 20 includes a production center database 60, scheduling module 62, building loader 64, and billing and database maintenance module 66. In general, production center database 60 stores data related to advertising, "real time" content, and building parameters.

Scheduling module 62 uses the data to produce play lists 68 for each building 14. As discussed above, a building play list 68 (FIG. 5) serves as the recipe used by building server 28 to create display presentations exhibited throughout the day. Scheduling module 62 also provides advertising and content usage information to billing and database maintenance module 66 which generates billing summaries and invoices 70 for each advertiser and "real time" content supplier. Billing summaries and invoices 70 are also stored for later retrieval in the production center database 60.

Production Center Database

Production center database 60 includes three basic types of data: 1) building characterization; 2) "real time" content, and 3) advertising content.

Building characterization data is generated to establish a particular building's micro-demographic profile. Creating a micro-demographic begins with a building characterization process. The building characterization process consists of three components: 1) building geography—where is the building (city, state, region(s), etc.); 2) business segments—the building population is categorized into business segments (banking, insurance, financial services, law, advertising, real estate, etc.); 3) self learned—the system is able to learn building characteristics once installed. Peak travel periods (used to establish prime time periods) and average elevator occupancy (important in scheduling) are examples of self-learned characteristics.

The results of the characterization process are stored as building characterization data in production center database 60 for use in the scheduling process and includes the information listed in Table I below.

TABLE I

| | |
|---|---|
| Building Designation | <Building ID> |
| Building Location | <Building Name> |
| | <Street Address> |
| | <City, State ZIP> |
| Management Organization | <Name> |
| | <Street Address> |
| | <City, State ZIP> |
| Management Contact | <Name> |
| | <Phone> |
| Building Population | <number of occupants> |
| Building Classification | <primary classification> |
| | <secondary classification> |
| Regional Designation | <Region ID> |
| Local Designation | <Local ID> |
| Number of elevator displays | <number> |
| Number of lobby displays | <number> |
| Building hours | From: <time of day> EST |
| | To: <time of day> EST |
| Prime time periods | From: <time of day> EST |
| | To: <time of day> EST |
| Average elevator occupancy | <number> |
| Network Address | <IP Address> |
| Authentication | <Authentication ID> |
| Subscription Fee | <$/month> |
| Real Time Content Preferences | <List of Content> |

The results of the characterization process are stored in production center database 60. The format of this data is described in the building characterization data section. Online content providers and advertisers create associations between their target audience and the buildings by specifying audience micro-demographics. The micro-demographics choices for the advertisers map one-to-one with the characterization categories for the buildings, shown in Table I therefore ensuring an association. As will be described below, a scheduling module maps the advertisements to the buildings via these associations As stated above, "real time" information (general information) is the data which is merged with advertising data to create elevator display data. To accomplish this, the content of the "real time" information must adhere to specific formats which represent segment sections 44, 46 of display 13 and describe the content 50, 52, 54 contained within those segments (FIG. 4).

For example, for each "real time" content source 22 (FIG. 1), production center database 60 contains an entry describing the format type and locations for each content segment within that format. The format determines the number of segments for each entry. Locations are described using Universal Resource Locators (URLs). The database parameters maintained for each "real time" content source are shown below in Table II below.

TABLE II

| "real time" Content Designation | <RT ID> |
|---|---|
| Source | <Provider Name> <Street Address> <City, State ZIP> |
| Source Contact | <Name> |
|  | <Phone> |
| Refresh Interval | <time> |
| Format Designation | <format ID> |
| Content Segment 1 | <URL> |
| Content Segment 2 | <URL> |
| Content Segment N | <URL> |

Advertising content data consists of two components. The first component defines when the advertisement must be run, the locations it is run, and for how long it runs. The second component describes where the advertisement is retrieved from and how it is inserted into the display. Consider the run parameters first. Advertisers will purchase advertising time on the system in units of Cost Per Thousand Impressions (CPM). Advertisers may further target specific demographics by requesting the advertising be distributed nationally, regionally, locally, or at a specific business segment. In addition, an advertisement campaign is likely to have time parameters as well. For example, the campaign may run for only two weeks with exposure required to be made between 10:00 AM and 1:00 PM each day. These concerns constitute the advertising run parameters. Equally important is the actual advertising content and how it is integrated into the system and displayed. The parameters that describe this information are the content parameters which include the advertising locator and format type. The database parameters maintained for each Advertising content source are shown below in Table III.

TABLE III

| Advertisement Content Designation | <ADVERTISEMENT ID> |
|---|---|
| Source | <Provider Name> |
|  | <Street Address> |
|  | <City, State ZIP> |
| Source Contact | <Name> |
|  | <Phone> |
| Undelivered Impressions | <number> |
| CPM | <$> |
| Advertisement Start Date | <date> |
| Advertisement Finish Date | <data> |
| Demographic Selector | <micro-demographic> |
| Prime Time Requirement | <% of advertisement run time> |
| Delivery Time | <start time □ end time> |
| Advertisement Format | <format ID> |
| Advertisement Locator | <URL> |

Scheduling Module

Scheduling module 62 has the primary function of creating building play lists by generating both advertising and "real-time" content from production center database 60 and then merging the content.

Figure 6:
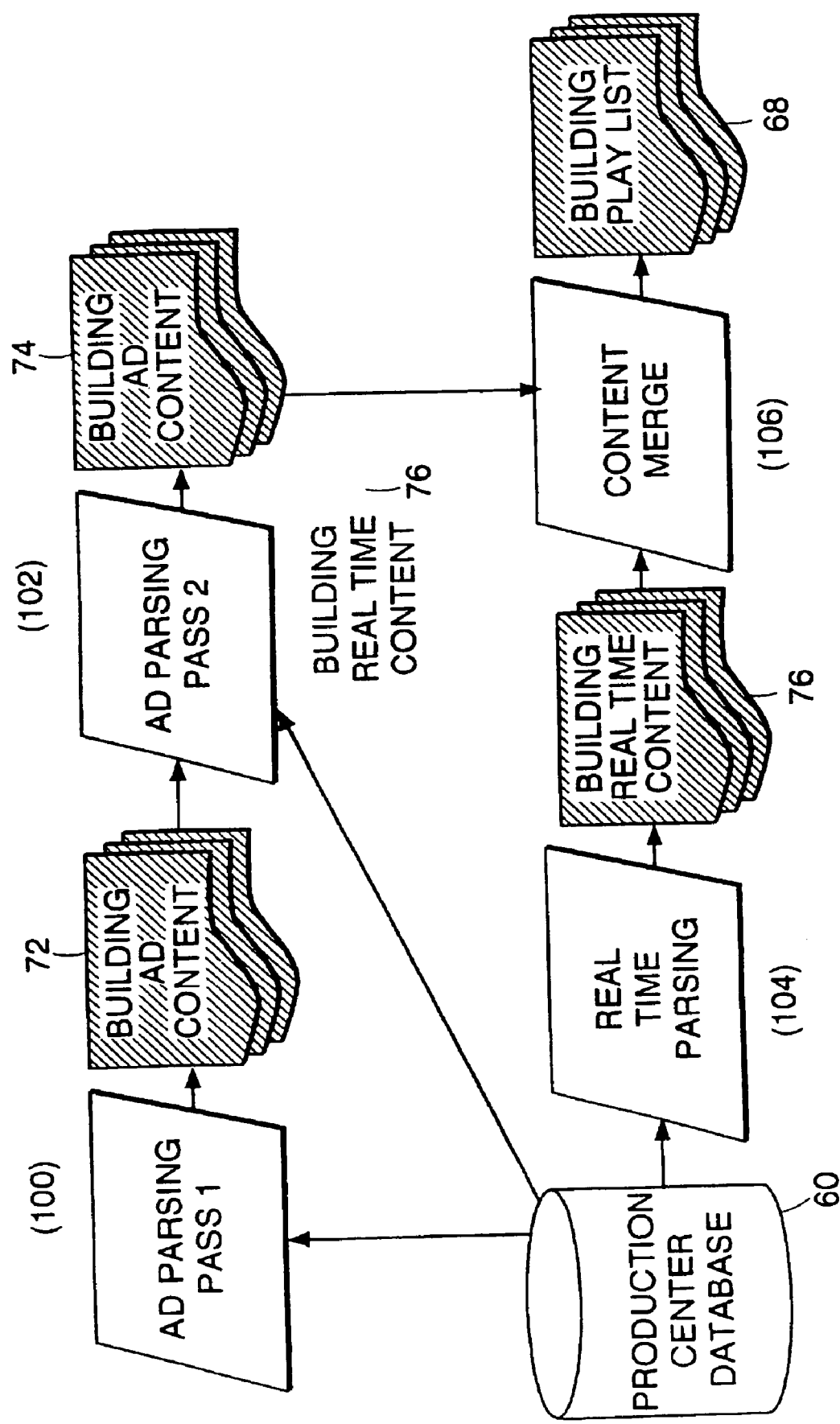
FIG. 6 is a flow diagram for the operation of a scheduler module of the production center.

Referring to FIG. 6, scheduling module 62 performs a first parsing step (100) to determine which buildings are potential targets for each advertisement in production center database 60. Scheduling module 62 utilizes information provided by the advertiser in an automated request entry process to generate an initial list 72 of buildings and advertisements which can be paired together. The entry process is available to advertisers using the production center website which provides an electronic entry form for allowing the advertisers to enter the required information needed to schedule an advertisement for viewing by a targeted demographic, business population. Alternatively, advertisers may provide the pertinent information through a phone interview, an application form, or a third party representative. Initial list 72 is further pruned in a second parsing step (102) using secondary criteria, such as advertisement start/finish dates, prime time requirements, delivery times, and impression parameters. The result of these pairing steps is an advertisement building-specific list 68 indicating advertisements and time intervals for when those advertisements could potentially be displayed.

Next, scheduler module 62 considers "real time" content preferences for each building as set forth by building characterization data (see Table I) associated with that building (104). Using this information, a "real time" building specific list 76 of "real time" content is generated.

With both the advertising content and "real time" content specified for a particular building, scheduler module 62 merges lists 74 and 76 to provide a building play list 68 (106). In particular, when merging the advertising and "real time" content for each building 14, scheduler module 62 considers the content format, time intervals, and advertisement distribution. Time intervals and advertisement distribution are considered first because they determine when an advertisement will be displayed and what "real time" content will accompany it. "Real time" content is presented at fixed intervals (e.g., every 30 seconds). As a result, scheduler module 62 will place the "real time" content first.

Advertising placement is also subject to distribution and occupancy considerations. The commuting patterns of the network audience is always an important distribution consideration in effectively distributing a particular advertisement. For example, most people arrive to work, take lunch, and leave work within 30 minutes of the same time each day. Scheduler module 62 ensures therefore, that the same advertisement does not run within 30 minutes of when it ran the previous day for any given building. The result is a more uniform advertisement distribution within a building demographic. Advertising occupancy is another important consideration. Advertisements can be rotated quickly (e.g., every 15 seconds). Without a fully populated advertisement schedule however, system 1 would constantly rotate the same advertisement or a limited set of advertisements. This could be a potentially unattractive annoyance for elevator passengers. To eliminate this possible annoyance, scheduler module 62 lengthens the display period for each advertisement to make the transitions less noticeable.

Once advertising and "real time" content has been defined for each time slot, scheduler module 62 creates the display. The format of the advertising and "real time" content is critical because it determines which of a variety of templates is selected to create the overall display. As has been described, both the advertising and "real time" content must adhere to one of a set of predefined formats. When both are merged together they are placed into a frame. Frames represent the template from which the final display is generated. Since content formats can vary, scheduler module 62 selects the appropriate frame type in order to merge them. The number of content formats is intentionally limited to simplify the merging process. With the time slot and frame type information defined, scheduler module 62 is able to construct building play list 68.

Referring to FIG. 7, the format of a building play list 68 used to manage the assembly of both "real time" content data and advertising content is shown. Play list 78 includes a "real time" content section 80 which is generated directly from "real time" data within production center database 60 and defines refresh periods for the "real time" content. Play list 78 also includes an advertising content section 82 which defines the time as well as frame type used for the advertising content.

Referring again to FIG. 5, production center 20 also includes a building loader 64 which serves as the interface between production center 20 and buildings 14 within system 1. Because communication with the buildings occurs over Internet 24, an inexpensive, yet broad distribution mechanism is provided. Unfortunately, Internet 24 also represents a path for potential system corruption. In consideration of this risk, system 1 is designed to require that each building server 28 request information from production center 20, rather than having production center 20 broadcast data. Building loader 64 performs an authentication procedure to ensure that the request is being made from a server associated with and recognized by system 1 for each building requesting a play list. Before being distributed, building loader 64 encrypts the play list to further protect the information from potential corruption.

Billing and Database Maintenance Module

Billing and database maintenance are also critical to the closed loop nature of system 1. As discussed above, scheduling module 62 generates building play lists based on micro-demographic parameters and the statistical probability a number of advertisement impression are made at a given time within a specific building. To close the system loop, elevator occupancy information is accumulated for each 14 building on a daily basis. This allows system 1 to adapt to changes in building characteristics to better distribute the advertising and content. A billing and database maintenance module 66 is used to provide this feedback to system 1. The two operations, billing and database maintenance, leverage the same processes, but deliver different outputs. The feedback process involves overlaying building play lists 68 onto the building occupancy numbers. From this process, the actual number of impressions can be calculated for each advertisement. The billing operation will use the information to create reports and invoices 70 for the advertisers. The database maintenance operation uses this data to update production center database 60 with the impressions for each advertisement yet to be delivered. That is, the number of "Undelivered Impressions" (see Table III) is updated. In addition, billing and database maintenance module 66 will further alter the building occupancy numbers to update the building characterization data. For example, billing and database maintenance module 66 may update fields labeled "Building hours", "Prime time periods" and "Average elevator occupancy" (see Table I). Important feedback here is defining dead zones (times when there are few elevator passengers), peak viewing periods, and average elevator occupancy. These are important parameters used by scheduling module 62 in the scheduling process.

Building Server

In general, building server 28 interfaces with production center 20, caches advertising and "real time" content, develops elevator displays, and manages local area network 30.

Figure 8:
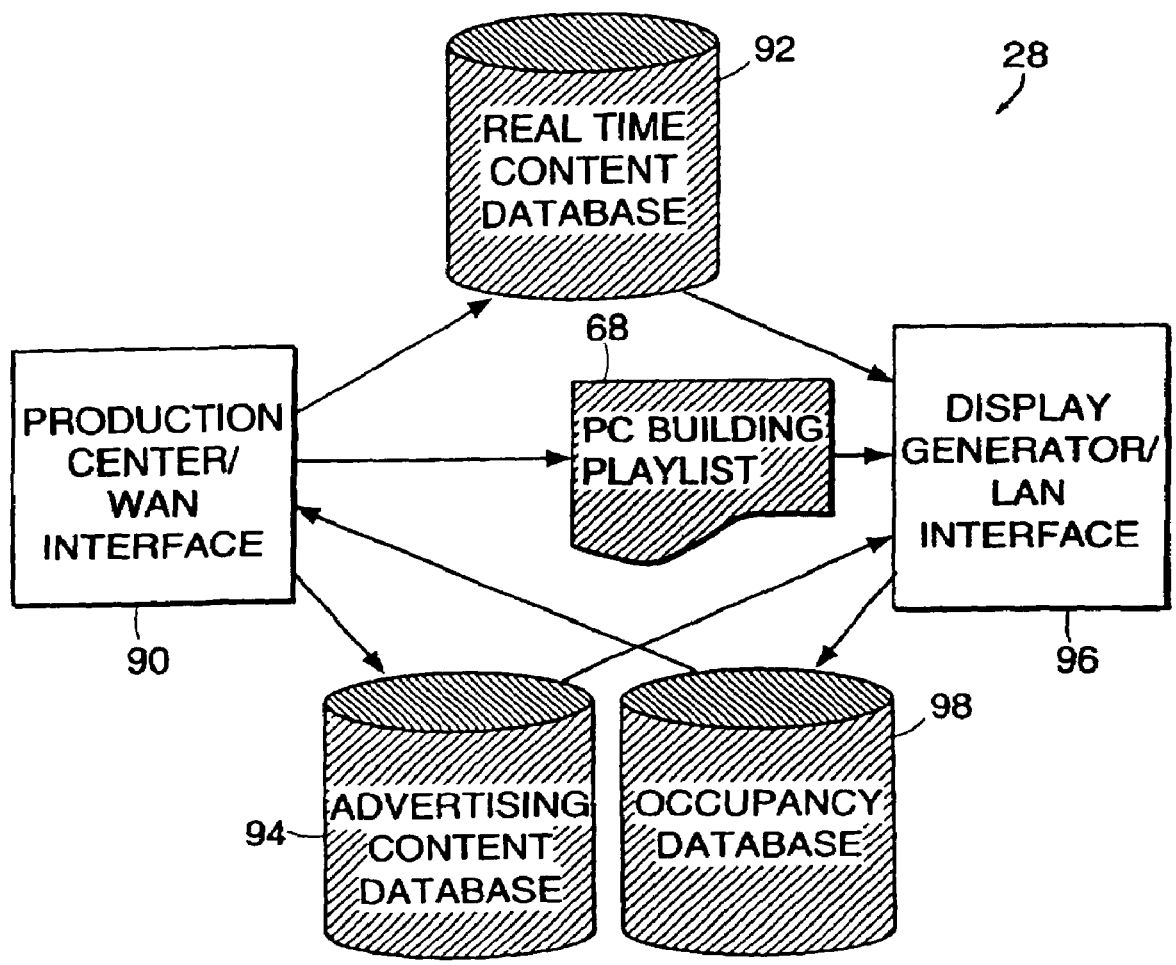
FIG. 8 is a functional block diagram of a building server of the building subsystem portion of FIG. 3.

With reference to FIG. 8, building server 28 includes a production center/WAN (PCWAN) interface 90 which is responsible for communicating with production center 20 and the Internet 24. As previously described, each building 14 receives from production center 20 a play list 68 which defines the display content and time interval the display content is to be presented. Internet 24 is used to capture the "real time" content and transport the advertising information. "Real time" output from interface 90 is deposited into a local "real time" database 92 while advertising output retrieved from Internet 24 is cached in an advertising database 94. These represent local copies of the information retrieved via the Internet. Local copies are maintained in order to avoid latency problems which would realistically prohibit creating high performance display presentations including, for example, animation, streaming video, and movie effects. Updates to the databases are performed as needed as defined by the building play list.

Assembly and display of the content is performed by an Display Generator/LAN (DGLAN) Interface 96 which interprets building play list 68 and assembles the specified content. The result is an HTML file, served via local area network 30 to each elevator display unit 10.

Building server 28 also includes an occupancy database 98 for storing information relating to occupancy of the individual elevators 12 in the building.

Production Center/WAN Interface

Figure 9:
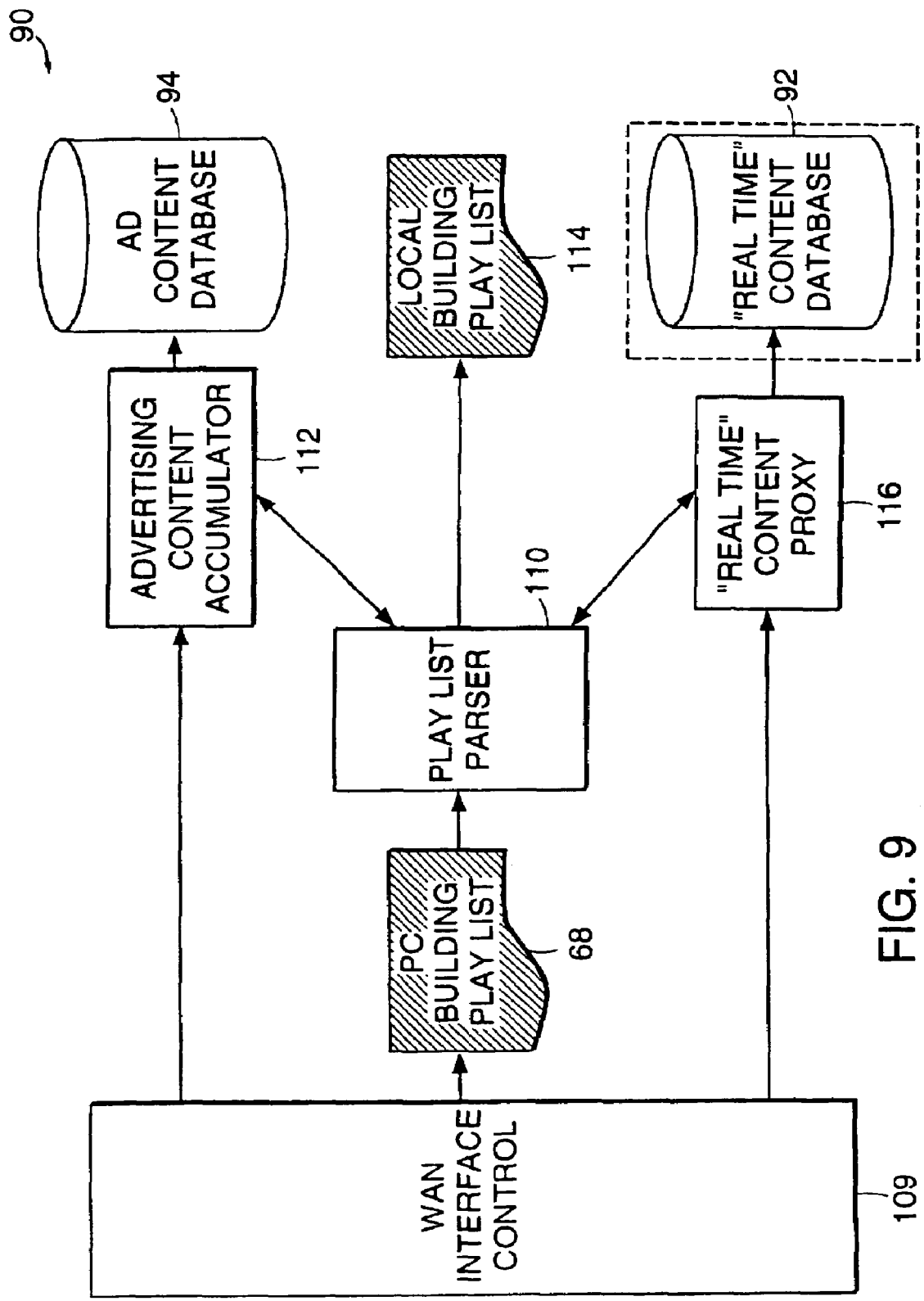
FIG. 9 is a functional block diagram of the wide area interface between building servers and the distribution channel.

Referring to FIG. 9, PCWAN interface 90 manages the interaction with Internet 24. Interaction with the wide area network (WAN) is generally initiated from the buildings in order to increase security within the system. PCWAN interface 90 includes a play list parser 110, which performs a translation to create local references for the advertising and "real time" content. The translation is required because all content displayed within building 14 is cached locally within databases 92, 94. Thus, the WAN-based URLs contained in the original play list are invalid. Parser 110 also interacts with an advertising content accumulator 112. Since advertisements are stored locally to the building, an accumulation process must take place to create this local store. Parser 110 initiates advertisement accumulation when it determines the play list contains an advertisement not currently available in the advertisement content database. The accumulator function will interface with the WAN to retrieve the missing content and store it in the database. The local URL for the advertisement is returned, which the parser writes to the local building play list. A similar operation takes place for "real time" content. In this case however, updates are performed based on a refresh period. The refresh period for "real time" content is defined in the building play list. Play list parser 110 passes the refresh period, the WAN based URL, and the "real time" database address to the "real time" proxy module 116. Proxy module 116 schedules the refresh cycles and interfaces with the WAN interface control 109 to retrieve the "real time" content. The content is stored based on the locator provided by parser 110.

Display Generator/LAN Interface

Figure 10:
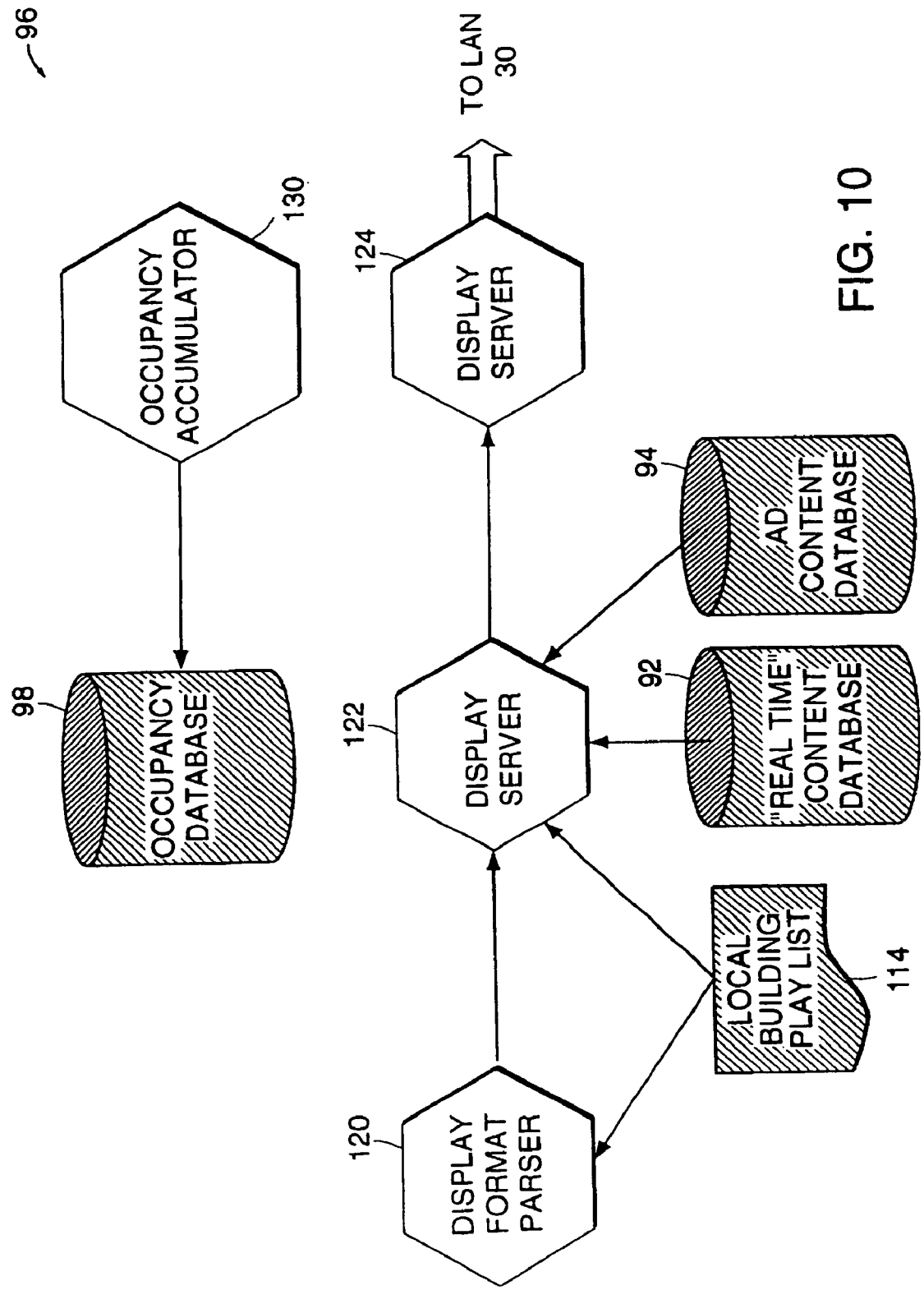
FIG. 10 is a functional block diagram of the display generator LAN interface.

Referring to FIG. 10, Display Generator/LAN (DGLAN) interface 96 performs two distinct operations: 1) assembly and transfer of the display, and 2) occupancy data collection.

With respect to the second of these operations, occupancy calculations play a very important role in the system. Advertising is measured in cost per thousand (CPM) impression increments. An impression is defined as someone being exposed to the advertisement. In system 1, advertisement exposures occur in elevators 12. To quantify the number of advertisement impressions displayed using system 1, a method for measuring elevator occupancy is required. The DGLAN Interface 96 accumulates measured information from each elevator and creates occupancy database 98 for each of buildings 14. An occupancy accumulator 130 extracts the measured data from each elevator during system downtime (typically at the end of the day). This information provides the elevator occupancy at constant intervals throughout the day. Occupancy accumulator 130 summarizes this information into a single list, which is passed to production center 20 for billing.

Display assembly and transfer is the primary function of DGLAN Interface 96. Display assembly is dictated by local building play list 114 which uses the same format as building play list 68 of FIG. 5, except that the "real time" control parameters are deleted and all content locators (e.g., URLs) have been replaced by local equivalents. DGLAN Interface 96 includes a display format parser 120 and a display assembler 122. Display format parser 120 uses Hyper Text Markup Language (HTML) to build the framework for the display. HTML is used extensively on Internet 24 to develop display information and is easily understood by modern browser technology. Display format parser 120 generates the HTML template that is used, once it is populated, to create the actual display. Local building play list 114 defines the frame type. Display parser 120 interprets the frame type and generates an HTML file, specifying the physical attributes of the display. These attributes include the absolute position, size, and definition of each content segment. Missing from the template are the pointers to these content segments. Content segment pointers are generated by display assembler 122.

Display assembler 122 is used in the final step of the display generation cycle. Display assembly is initiated based on the time intervals defined in the play lists. Each display is assembled and passed to a display server 124 as defined by its time indicator. Display assembler 122 parses the HTML template generated by the display format parser 120 to find the content segment definitions. The template will match the content segment definitions specified in play list 114. As a result, display assembler 122 inserts the location pointer for each content segment. When each content segment pointer has been inserted, the HTML file is ready to be passed to elevator display units 10.

Elevator display units 10 are connected to the building server 28 via local area network 30. Display server 124 manages local area network 30 by retrieving the HTML file from display assembler 122 along with the "real time" and advertising content specified by the HTML. Display server 124 then translates this data into a display format compliant with elevator display units 10, encapsulates the translated data with a file transfer protocol and passes the encapsulated data to network switch 40 (FIG. 3) for broadcast. The task of retrieving the data from display assembler 122 is made more difficult by the great distances (e.g., >1500 feet) that separate building server 28 from elevator display units 11.

Figure 11:
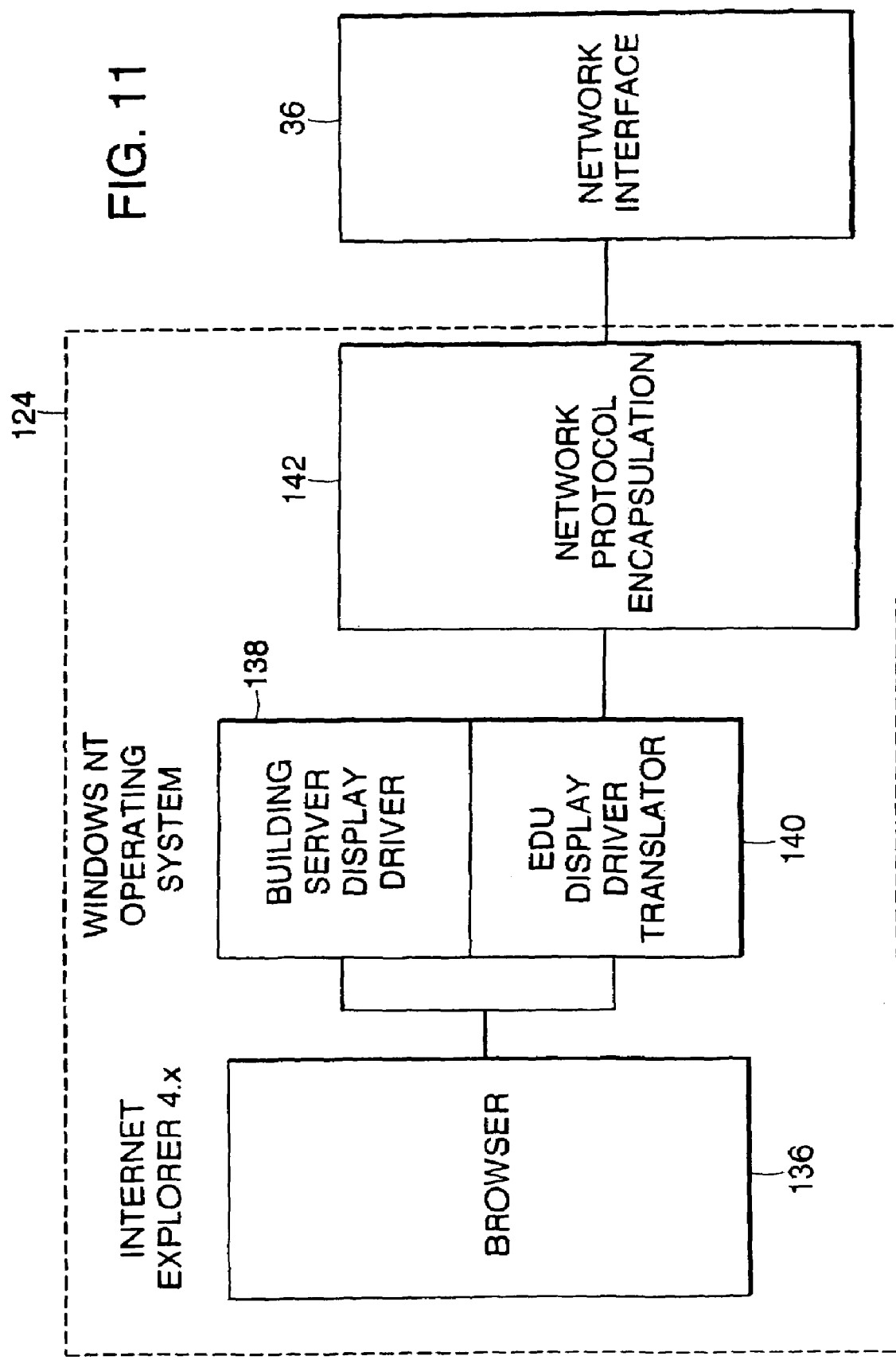
FIG. 11 is a functional block diagram of the display server architecture.

Referring to FIG. 11, display server 124 and elevator display units 10 form networked host/display pairs, where elevator display 13 is merely an extension of the server display. The HTML file is interpreted by a browser 136 (e.g., Internet Explorer 4.0, a product of Microsoft Corporation☐). Browser 136, within the operating system (e.g., Microsoft Windows NT a product of Microsoft Corporation☐) used by building server 28, interfaces with a display driver 138 to communicate with hardware associated with display 13. Display data is extracted by a translator 140, which retargets the data to elevator display unit 10 and display 13. This data is cached local to server 28 to reduce the effects of browser refresh delay. A network protocol encapsulation software module 142 extracts the data from the cache and adds a TCP/IP communication layer. The encapsulated data is passed to the network interface and transmitted through network switch 30 (FIG. 3) to the LAN.

Further embodiments are supported by the following claims. For example, the distribution channel used by information distribution system 1 described above is the Internet 24. The Internet, or "web" provides a growing and existing infrastructure for obtaining information and establishing communication between computers. However, information distribution system 1 can also be implemented using other communication channels including cable modem, satellite, XDSL.

Twisted pair lines 38, discussed above in conjunction with FIG. 4, can be replaced with other forms of transport media including fiber optic, coaxial lines, RF transmission). Moreover, in certain applications an asymmetrical digital subscriber line (ADSL) can be substituted for the Ethernet connection in local area network 30 in FIG. 3.

Building Owner Manager (BOM) Interface

The information distribution system 1 shown in FIG. 1 was described above as including a production center 20 which interfaces with building servers 28 to develop presentations of merged advertising and general information for display on elevator display units 10. As also stated above, system 1 can provide building owners and managers the ability to communicate with tenants resident in their building. As will be described immediately below, this capability is provided to building managers through a Building Owner Manager (BOM) interface.

Figure 12:
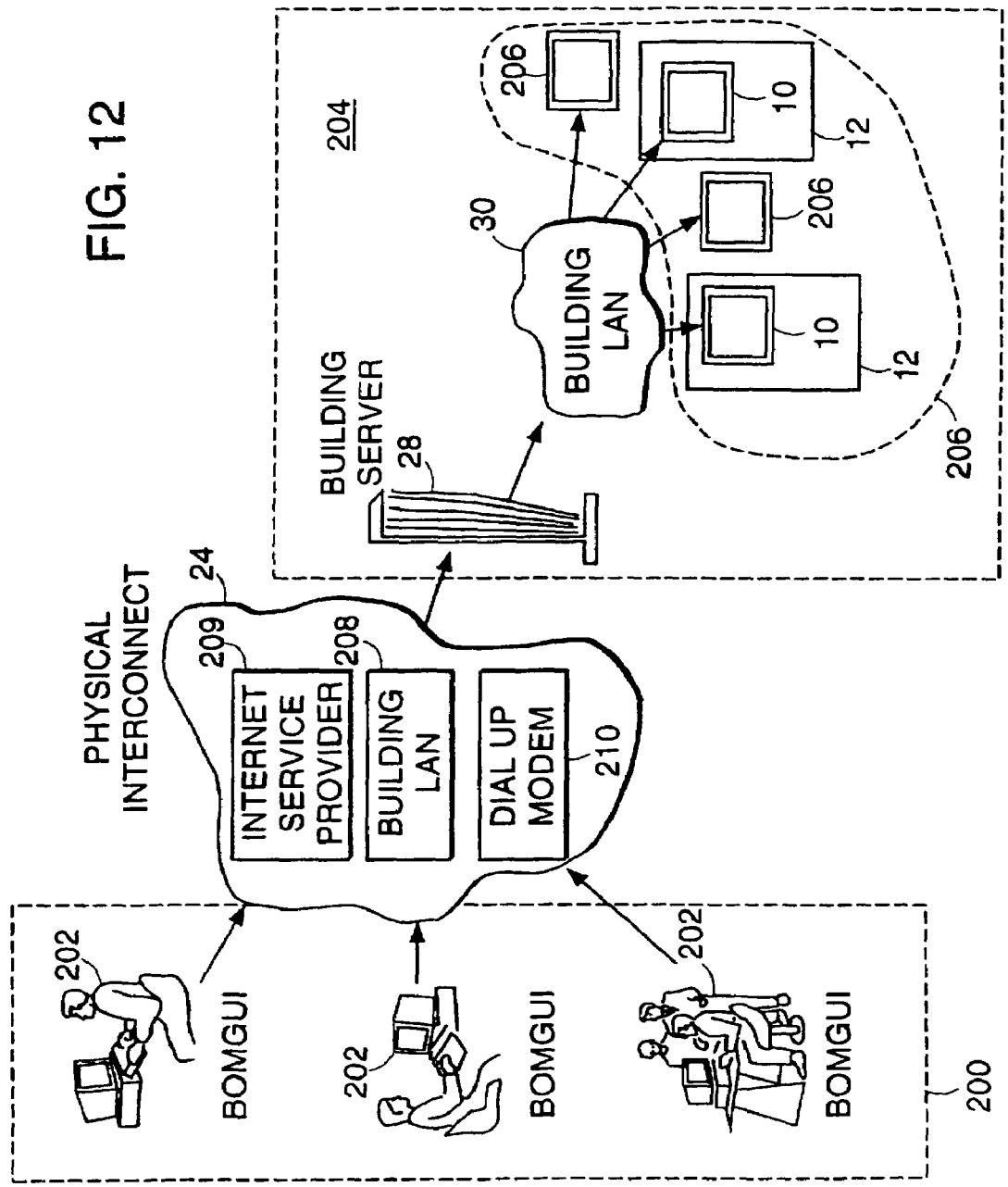
FIG. 12 is a block diagram illustrating the BOM interface of the information distribution system of the invention.

Referring to FIG. 12, for example, a BOM interface 200 is shown to include BOM interfaces (BOMGUI) 202 which communicate with one or more building subsystems 204 via distribution channel 24. Building subsystem 204 is shown to include building server 28, building LAN 30, and building display units 206 including elevator display units 10 mounted in elevators 12. Distribution channel 24, as shown in FIG. 1 was represented, for example, by the Internet. In this case, distribution channel 24 is shown to include other interconnection approaches, such as, a direct or indirect connection via a public building LAN 208, a dial-up modem 210, as well as an Internet Service Provider 209. It is important to note the distinction between public building LAN 208 and building LAN 30 of building subsystem 204. In particular, public building LAN 208 represents building management's own local area network for inter-office communication. Building LAN 30, on the other hand, is a private local area network, used exclusively for information distribution system 1.

In general BOM interface 200 allows building managers to deliver messages to building tenants who can view the messages on the display units 10 mounted in elevators 12 as well as other displays 206 positioned throughout the building. Messages generated using a BOMGUI 200 are merged at the building server without interaction from production center 20. Thus, building managers are able to control the creation of the messages and deploy and modify the messages quickly.

Examples of the wide variety of message types deliverable using BOM interface 200 include:

Time critical messages including fire alarm testing, parking garage closures, changes to building hours, building-specific traffic information;

Special Events such as holiday events, building activities;

New building features/services including health club, cafeteria facilities, parking, coffee shop, florist;

Public Address/Emergency messages including instructions for stuck elevator passengers, storm warnings, fire information; and Advertising messages such as announcements for available space, description of the management organization and their capabilities.

BOM User Interface (BOMGUI)

BOMGUI 200 represents the user portion of BOM interface 200 for providing an environment to building management to create, modify, and send messages to display units from literally anywhere in the world via nearly any of a wide variety of interconnection means.

Figure 13:
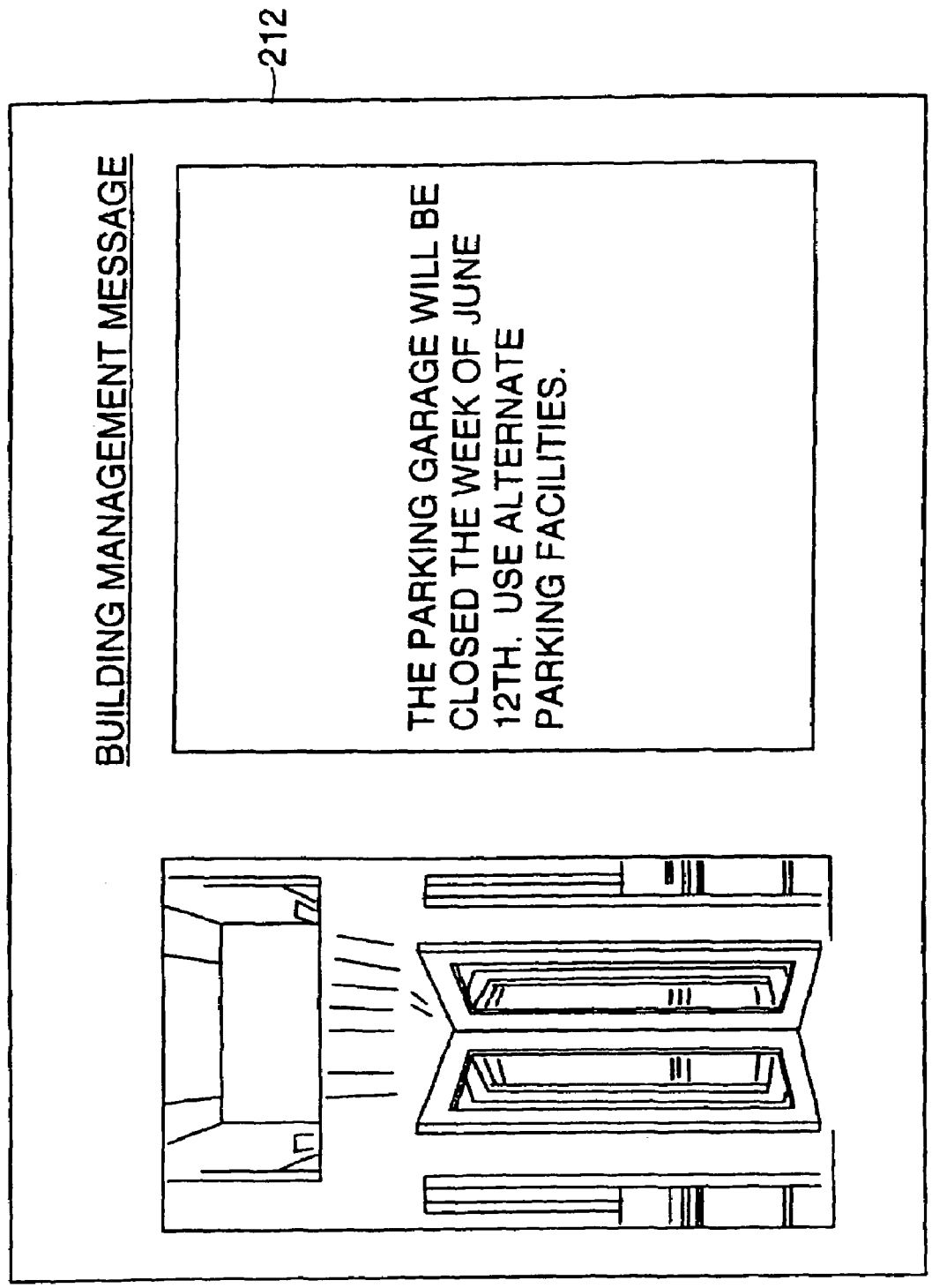
FIG. 13 is an example of a message template used by the BOM interface to create messages.

Referring to FIG. 13, BOMGUI 202 uses a template 212 to define message structure and format. Template 212 is based on HTML, thus providing a flexible and rich environment for its development. In one embodiment, template 212 fits in a 640×480 pixel format and utilizes a comment field <!—message text--> inserted where the message information is to be placed. The message text that populates the selected template is entered using BOMGUI 202. Text entry fields are provided which allow for tabs, carriage returns, and spaces, along with plain text information.

BOMGUI 202 is also able to import already completed html files. This enables building owners and managers the ability to create special announcements and display them on the information system without using the template structure discussed immediately above.

1.1.1 Message Creation

The message creation process requires that each of the fields of the template be populated. Within BOMGUI 202 this is accomplished in one of two ways. The first way uses a message creation wizard, a user-friendly program that takes the user through each step of the message creation process by prompting them for the required input as they populate each field. The second way uses a message entry form which may have been previously generated by the wizard and pre-stored to serve as a pattern for creating messages. This form contains all the message fields the user must populate and is typically used to edit an existing message. Using either approach, the result of the entry process is a valid message which can be displayed on the system. BOMGUI 202 converts the information from template 212 into a file, capable of being read and displayed on the display units of the system.

As will be described below, BOMGUI 202 includes parsers for parsing the selected template file. A first group of parsers searches for the comment field <!-message text-->. When this field is located, a second group of parsers operates on the message text to convert this information into an HTML format. The result is an HTML output file with the name <message name>.htm. This file is submitted to building server 28 for display on the system. BOMGUI 202 also allows managers the ability to preview messages prior to being displayed within the elevator or other displays in the building. This process is repeated for each message that is created by BOMGUI 202.

1.1.2 BOM Play List Creation

BOMGUI 202 allows building managers to create multiple messages for display in the building. These messages may be programmed to appear simultaneously or distributed throughout the week/month/year.

Referring to FIG. 14, a BOM play list 220 includes a series of building messages 221, each of which is comprised of several elements: start date, stop date, period of day, message template, and message text. The start and stop dates determine when the message is first displayed by the system and when it will be removed from the system. The period during the day a message can be displayed is also selectable within BOMGUI 202. In one embodiment, the day is divided into four segments: AM Segment, Lunch Time (LT) Segment, PM Segment, and Sleep (SLP) Segment. These represent time slots within the day, and are system programmable. For example, the AM Segment may be defined as the time from 6:00 AM to 11:00 AM each day. The building manager may select a specific time period for the message to run or they can choose to have the message run all day. Thus, BOM play list 220 defines time periods when each message is displayed and for how long (e.g., month, year). The format of BOM play list 220 is similar to the building play list 68 created by Production Center 20 described above in conjunction with FIGS. 5-9. However, BOM play list 210 includes additional start and stop fields.

BOM Play List 220 is created using BOMGUI 220 and is generated by individually stepping through each HTML output file message to determine the period of day and start and stop dates. The period of day is used to define in which time segments the message will appear. The start and stop dates are transformed directly into the BOM play list format. For example, the sample BOM play list shown in FIG. 14 indicates that bom_message1.htm is programmed to run in only the AM Segment between Jun. 12, 1998 and Jun. 13, 1998 while bom_message2.htm is programmed to run all day between Jun. 12, 1998 and Jun. 14, 1998.

As stated above, BOMGUI 202 allows building management to send messages to displays from literally anywhere in the world. This is accomplished using off-the-shelf LAN and WAN technology available in most computers today. BOMGUI 202 includes a connection setup menu. The connection setup menu allows the user to define the method(s) for interfacing with the building subsystem through the distribution channel 24. Using the setup menu, the user can create multiple paths to send messages to building subsystem 204. For example, when residing in the building, the building manager may send messages via public building LAN 208. This same building manager may also need to use BOM interface 200 to send messages to the system from a remote location via a dial-up modem 210 connection or Internet Service Provider (ISP) 209. In each case, the building manager would simply define the connection information within BOMGUI 202, save it, and then choose the appropriate connection setup each time a message is sent. BOMGUI 202 automatically attends to establishing the connection, sending the message information, and disabling the connection each time messages are submitted.

1.2 Building Subsystem

BOM interface 200 utilizes a BOM play list parser to parse BOM play list 220 in a manner similar to the manner used by play list parser 110 to parse building play list 68, as described above in conjunction with FIG. 9. Specifically, play list parser translates the BOM play list 220 to create local references for advertising or "real time" content.

BOM interface 200 is also configured to permit building owners and building managers to create and deliver messages through building server 28 and building LAN 30 to a specific one or more of elevator display units 10. This flexibility is particularly useful, for example, for providing instructions to elevator passengers in a stuck elevator. As a result, building management can maintain communication with the stuck elevator passengers without alarming passengers riding in other elevators.

In some embodiments, BOM interface works in concert with the production center/WAN interface 90 described above in conjunction with FIG. 9.

1.2.1 Play List Parsing/Development

Figure 15:
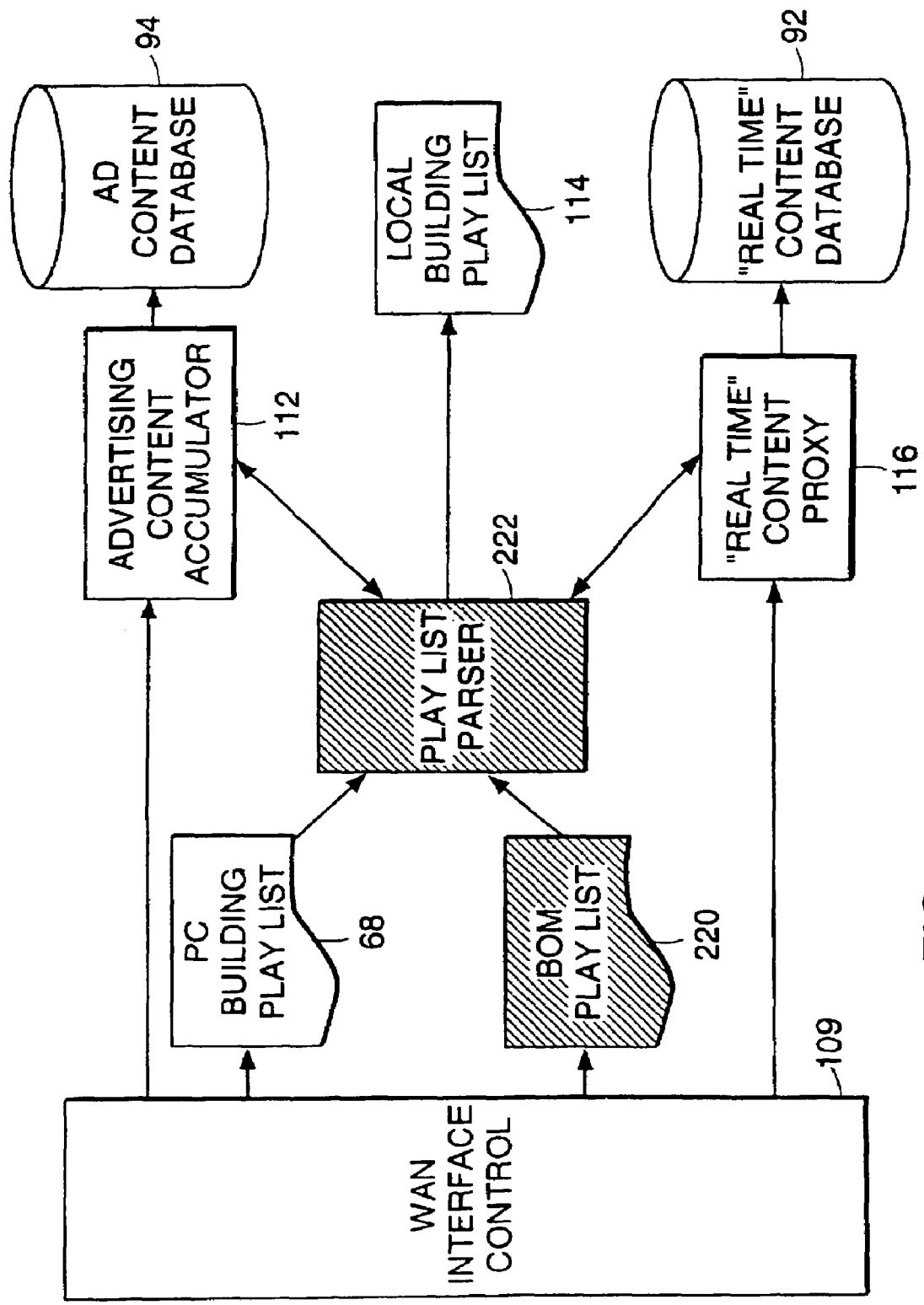
FIG. 15 is a functional block diagram of a building server of the building subsystem portion of FIG. 12.

Referring to FIG. 15, in this case, the local building play list parsing function of building server 28 must be modified to receive messages from both a play list assembled by production center 20 and BOM play list 220.

As described above in conjunction with FIG. 9, the operation of the play list parser 110 in the absence of a BOM Interface was to remap the URLs to the building database. With the addition of the BOM Interface, a play list parser 222 must now perform both a remapping and an interleave operation.

Figure 16:
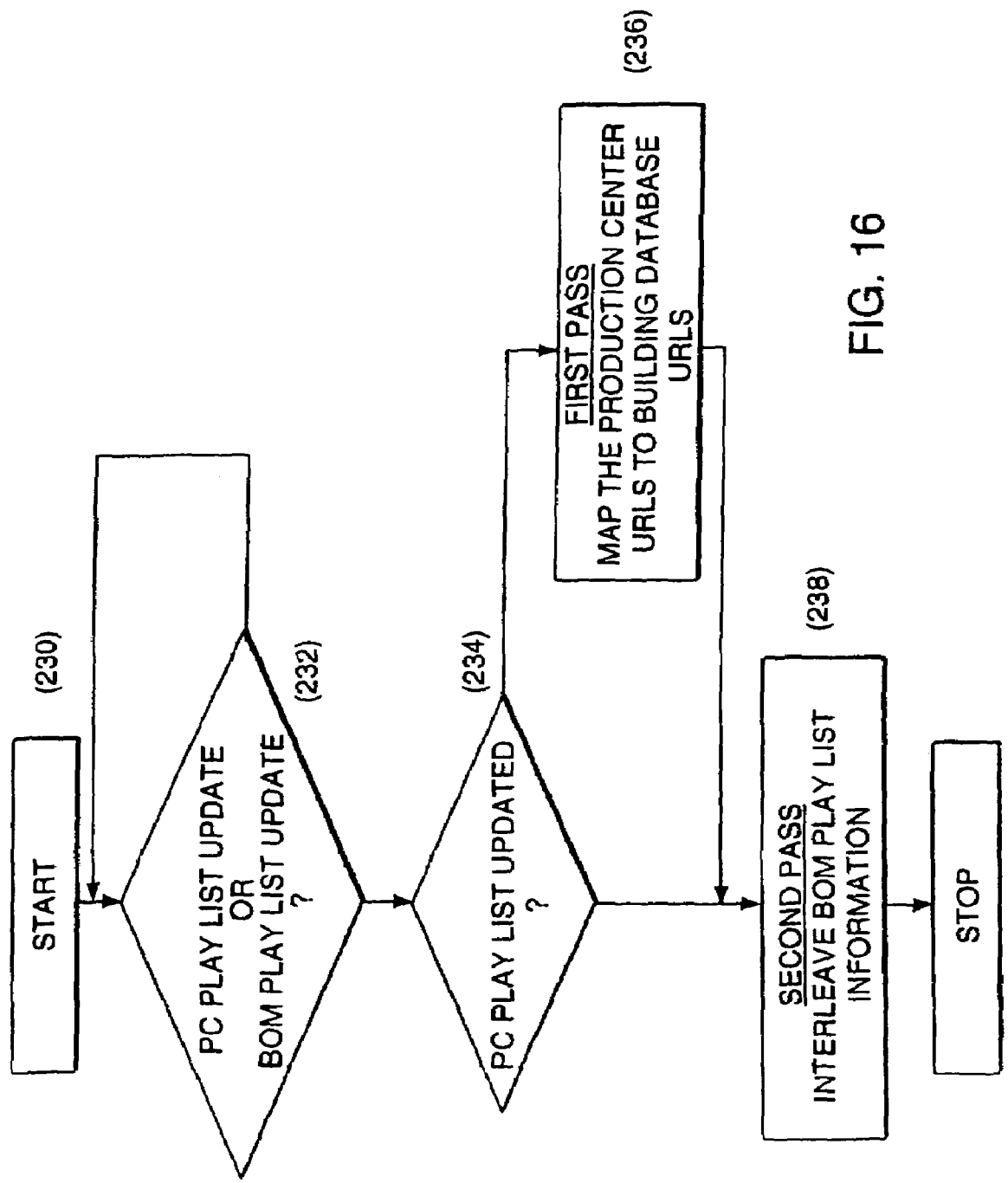
FIG. 16 is a flow diagram illustrating the operation of the parsing function of the BOM interface.

Referring to FIG. 16, play list parser 222 is initiated (230) by an update to either Production Center (PC) building play list 68 or the BOM play list (232). If an update has not been made to either play list, parser 222 will await a predetermined period of time and then poll to determine a change in the update status of the play lists. On the other hand, if either play list has been updated, parser 222 then queries whether PC play list 68 has been updated (234). PC building play list 68 represents the baseline version of the local building play list 114. That is, local building play list 114 is derived from the starting point created from PC building play list 68. If building PC play list has been updated, parser 222 performs the URL remapping (236) described above with reference to FIG. 9. Following the URL remapping, parser 222 performs a second pass to interleave information from the BOM play list 220 into the updated PC building play list 68 (238).

In other applications, BOM interface 200 is used independently by building managers as a means for communicating with their tenants without any interaction with a production center. In these applications, there is no PC play list within which the BOM play list interleaved. Thus, with reference to FIG. 16, play list 222 simply determines whether the BOM play list has been updated 232 and derives a local building play list 114 solely from BOM play list 220.

The goal of the interleave function is to insert a programmed number of building manager messages every minute during the designated time period using a round robin priority scheme. The number of messages inserted per minute can be programmed from 0 to all available slots. Of course, prior to inserting a message parser 222 will verify that the current date and time fall within the start/stop dates and time period parameters of the message.

Figure 17:
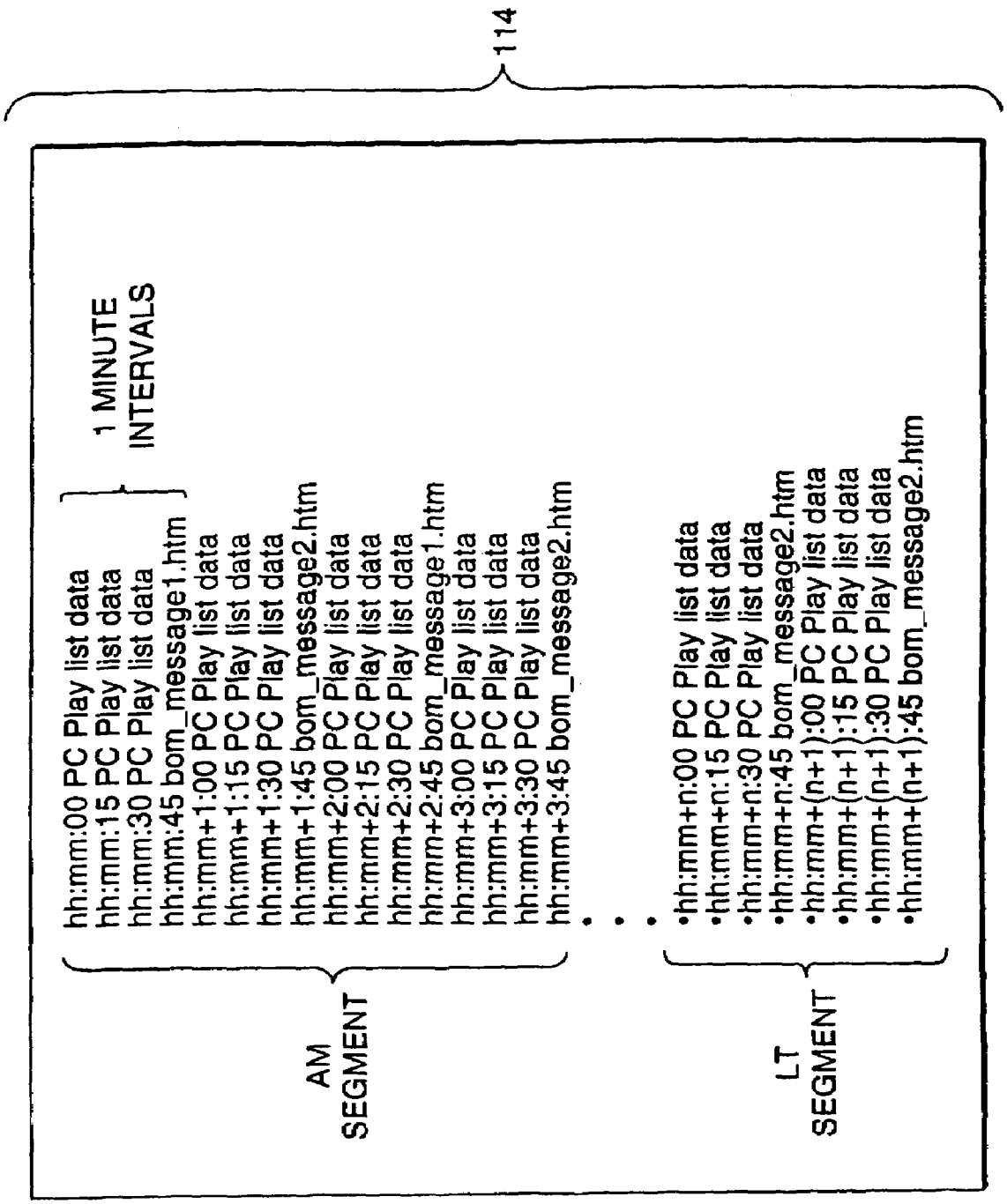
FIG. 17 illustrates the format of a local building play list.

An example will help illustrate the manner in which parser 222 functions. Assume a building manager has created and downloaded the BOM Play List shown in FIG. 14, via BOMGUI (202). If the current date is Jun. 12, 1998, and the slots per minute is set to 1, the parsers would produce a local building play list 114 shown in FIG. 17.

Note that during the AM Segment, both bom_message1.htm and bom_message2.htm are interleaved into the PC building play list 68. Also note that these messages alternate in "round-robin" fashion within the AM time segment. During the LT, PM, and SLP time periods only bom_message2.htm is displayed. In these time segments, this message will appear every minute.

1.2.2 Message Storage/Transmission

Unlike the Production Center path for content assembly described above in conjunction with FIG. 10, the pages created by BOMGUI 202 do not require modification by the building subsystem. However, the advertising component of the page will be subject to automatic assembly within the building.

Figure 18:
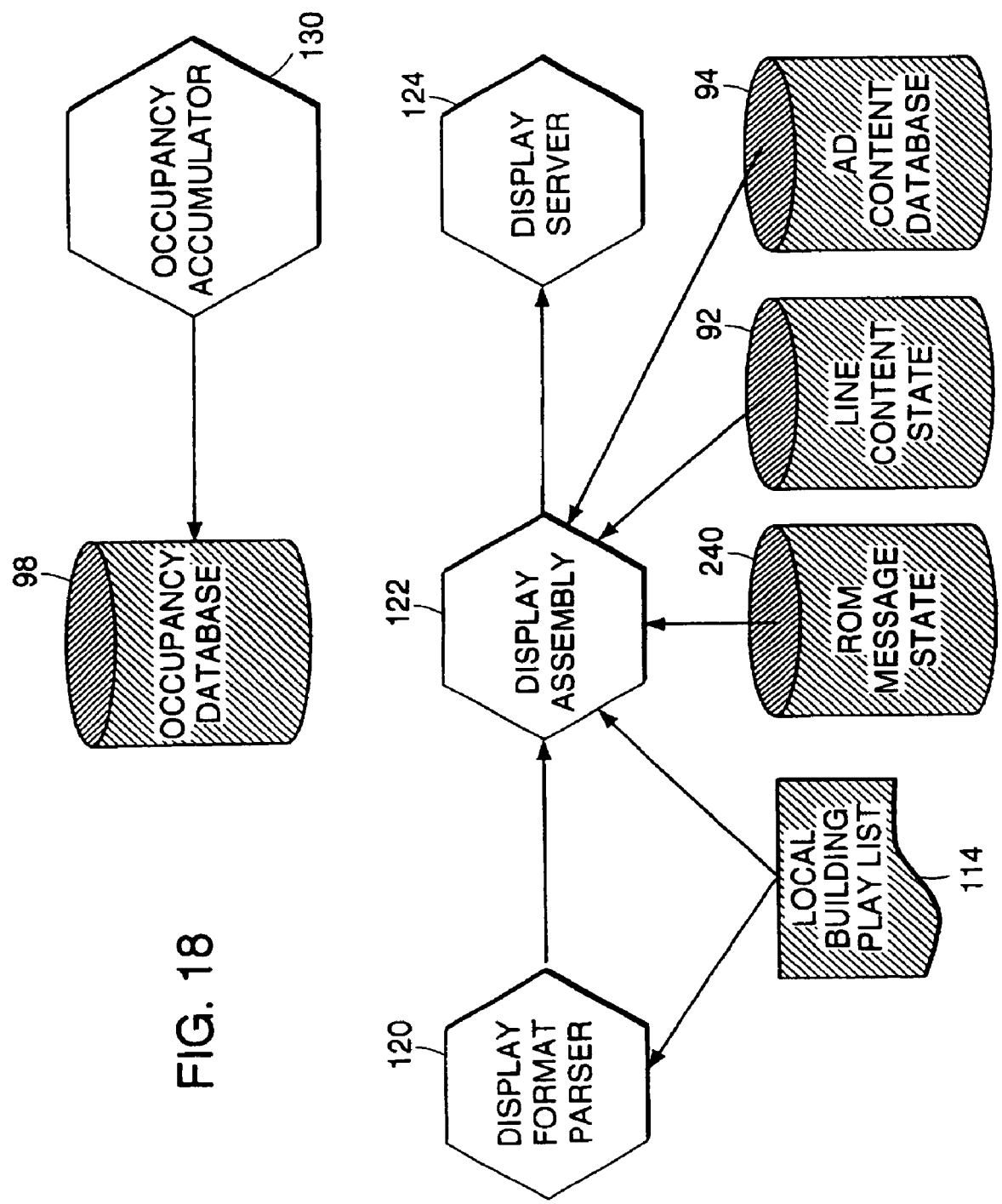
FIG. 18 is a functional block diagram of the display server architecture.

Referring to FIG. 18, BOMGUI 202 will deposit message files into a BOM Message Store 240. As display assembler 122 interprets the local building play list 114 it will look in the BOM Message Store 240 for all building messages. The advertisement associated with the message is defined by the play list and is inserted by display assembler 122 before being passed to Display Server 124.

In embodiments in which building subsystem 204 interfaces with production center 20, a dial-up modem connection is typically used to establish the connection. To add the functionality of BOM Interface 200, system 1 may need to be equipped with a network card to allow interaction with private building LAN 30. If the BOM Interface physical interconnect is via dial-up modem 210 or ISP 209, a single modem interface is sufficient. This is accomplished via software running on both the BOMGUI 202 and at the production center 20 which performs retries and allows data multiplexing. The result is a minimal hardware implementation.

1.3 BOM Interface Security

BOM Interface 200 represents a direct path into information system 1. As such, security for this interface is important to insure that inappropriate or unauthorized use is not allowed. The security procedures for the system are performed at three levels: BOMGUI password protection, secure connections, and password/access protection at the building subsystem. BOMGUI 202 performs a username and password check procedure prior to invoking the user interface. The passwords and usernames are encrypted and stored in a protected file. Only individuals with root privileges are allowed to manipulate this information. At the physical interconnect level, the path names and dial up properties are encrypted and only accessible by authorized personnel. Lastly, building subsystem 204 provides two layers of protection. First, user name and password verification is performed on every message request to the system. This insures that the security monitor of system 1 is aware of all licensed users. Secondly, the BOM message information is kept in a separate partition on the building server 28. This insures that an unauthorized user of the system is precluded from accessing other functions not associated with the system. This three phased approach should make it very difficult for any unauthorized access to the system to occur.

In the embodiment described above in conjunction with FIGS. 13-18, BOM interface 200 enabled building owners and managers to create and send messages to display units 10 mounted in elevators (or other displays) throughout a building. In particular, BOMGUI 202 represented the user portion of the interface for allowing owners and managers to create, modify, and send messages to display units from literally anywhere in the world.

Figure 25:
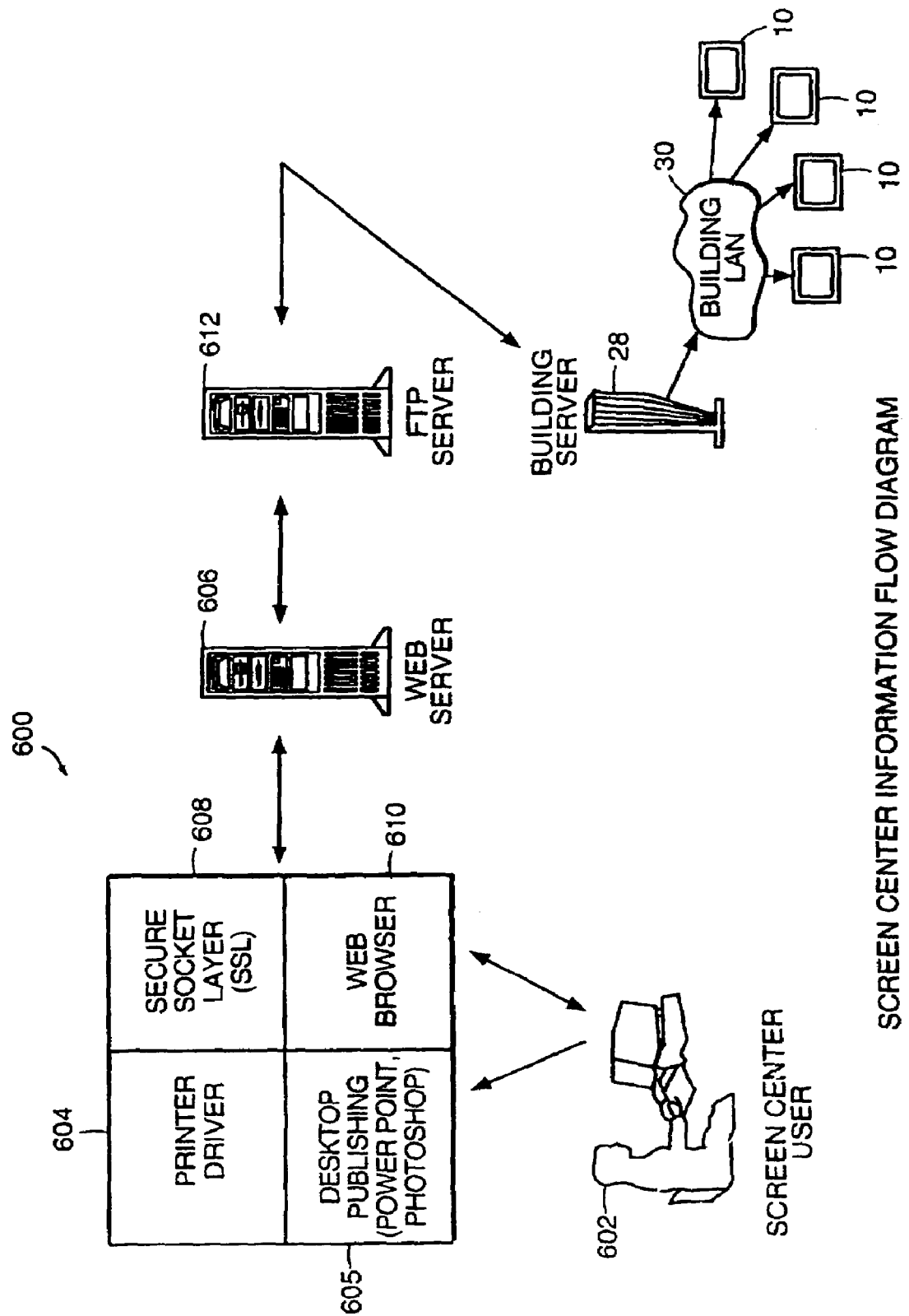
FIG. 25 is a block diagram illustrating an alternative embodiment of a BOM interface of the information distribution system of the invention.

Referring to FIG. 25, in another embodiment of a BOM interface 600, referred to here as "Screen Center Interface," allows a Screen Center user 602 to create messages using any of a number of different commercially available standard desktop publishing tools (e.g., Microsoft® Power Point, Adobe® Photoshop). In particular, to support the highly scalable and flexible nature of the system, the Screen Center Interface includes a printer driver 604, which translates a desktop image generated using the desktop publishing tool 605 into a file format consistent with information distribution system 1. Printer driver 604 then makes a web connection to a remote web server 606 via a secured socket layer (SSL) path 608. A web browser 610 allows the user to schedule messages and determine the buildings in which the messages will appear. In all cases the buildings available for a given user are strictly controlled through user id and password protection. Once the message has been scheduled, web server 606 places the message in an FTP site directory at FTP server 612 for each building targeted by the message and recreates the screen center play lists. During the next retrieval cycle, the buildings will collect the screen center play lists and messages and build them into a local play list.

An important element of this architecture is the ability of the system to have multiple messaging sources for any given building. Because the product is web based, owners of multiple properties can allow a local building manager, a regional manager or a marketing group to each have access to the messaging capability within the buildings. The user id and password protection restricts access on an individual basis, and also provides that different groups could get a greater or lesser share of the available message inventory. The intelligent building server takes care of interleaving the multiple message sources and providing the proper access to inventory.

Generic Play List and Content Selection

In the embodiments of the invention described above, the local building play list specifies the content used for each slot in the building programming. The content is retrieved from known sources to a central location on the building server. This content information is provided to the elevator displays based on the local building play list. Another embodiment of the method and system of the invention may be used to provide a building owner with greater flexibility in choosing the content and the mix of information displayed in the building. In this approach, information is still retrieved from known sources by content mapping. However, when the retrieved files are delivered to a processor in the building, such as, for example, a building server, a virtual hierarchy is added. The reason for this hierarchy is two fold. First, information is managed by category, and multiple sources of information may be present in a source directory in the content mapping file for a single category. As a result, the building server compresses the multiple sources from the source directory in the content mapping file into a single category to create the local play list for its particular building. Second, the building server creates the local play list by inserting into the list in circular, repeating series (referred to herein as round-robin) information from the source directory in the content mapping file for a particular category.

This embodiment provides another layer of protocol to accommodate the dynamics of communicating with an elevator in a high-rise building.

Figure 19:
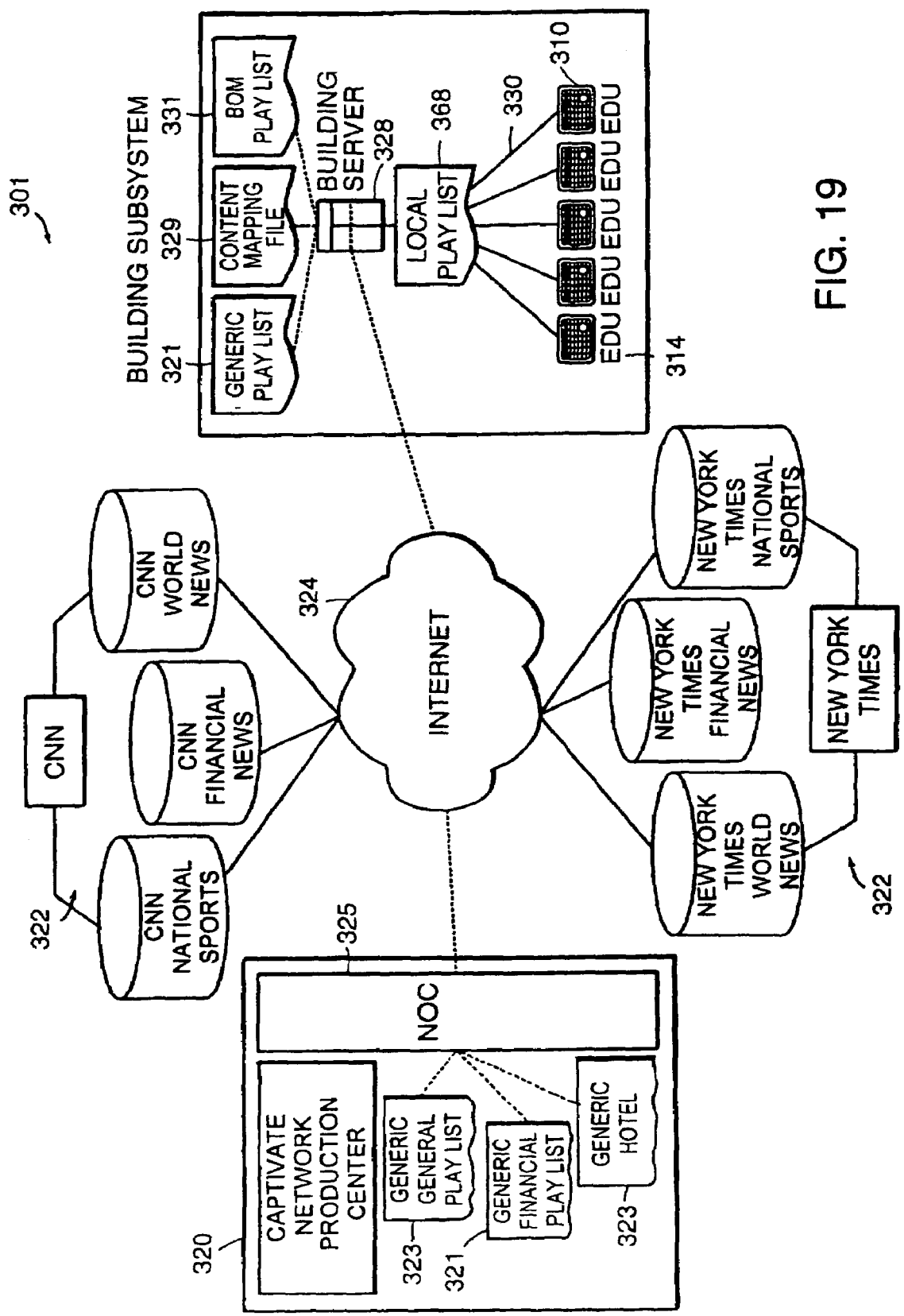
FIG. 19 is is a block diagram of the information distribution system of the invention.

Referring to FIG. 19, an information distribution system 301 is shown that provides a media outlet for distributing video information to elevator display units 310 in a building subsystem 314. As noted above, the video information transmitted may include any combination of general, commercial and building related information. The system 301 includes a production center 320 with a network operations center (NOC) 325 that creates a generic play list 321 for each building 314.

The generic play list 321 defines categories of video information 323 to be displayed at the elevator display units 310, such as national news, local sports, events, weather, traffic, and the like. Although the generic play list 321 defines a category or type of information that is to be displayed, it does not specify a content source 322 of information in that category to be retrieved via the distribution channel (here the Internet 324). A processor in the building, in this embodiment a building server 328, uses a content mapping file 329 to define the actual sources of information 322 specified by the categories of information in the generic play list 321. The processor in the building that accesses the content mapping file is not limited to a building server, but may also include, for example, a sufficiently powerful computer system in the elevator or in the electronic display unit 310. Building owners may then optionally add building information from the Building Owner Manager (BOM) play list 331 so that the processor may generate the local building content play list 368 and distribute to the elevator display units 310, for example via a building LAN 330.

Generic Play List

The generic play list 321 defines the density of information to be displayed in the building elevators and provides a script used to develop the local building play list 368. As noted above, the elements in the generic play list 321 are categories of information. These categories define the type of information that will eventually fill each element of the local play list 368. Unlike the content play lists in the embodiments of the invention described above, the generic play list 321 does not provide any specific pointers to files specifying sources of information, but includes only categories of information. Thus, an elevator passenger will not see a screen that has the same name as a slot in the generic play list. An example of a generic play list is shown in Table IV below.

TABLE IV

AMS,world_news
AMS,national_news
AMS,local_news
AMS,weather
AMS,national_sports
AMS,local_sports
AMS,local_restaurant
LTS,national_business
LTS,traffic
LTS,weather
LTS,local_business
PMS,local_news
PMS,local_events
PMS,local_places
PMS,traffic
PMS,weather
SLP,world_news
SLP,national_news
SLP,national_sports Much like the content play list shown in FIG. 6 above, the format of the generic play list 321 matches the day parts, or segments (AMS, LTS, PMS, SLP) with the categories of information (local_news, national_news, traffic, weather, etc.) to provide maximum flexibility for the programming manager developing the network schedule. The generic play list format described in Table IV also allows the programming manager to develop generic play lists 323 that target specific viewers. For example, a generic play list targeting buildings in the financial community may have a greater density of financial and market information than a generic play list that targets buildings primarily populated by the medical or legal community. The advantage of the generic play list format is that these targeted play lists can be applied across multiple markets. This is accomplished by the using the content mapping file 329 to target the generic play list 323 to a specific market or building.

Content Mapping File

The content mapping file 329 defines the sources of information 322 specified in the generic play list 321. The content mapping file 329 allows the building owner/manager to select a specific source of information 322 within a category of information in the generic play list 321 to create a unique viewing environment within an individual building. For example, the content map enables a building A to choose CNN as the world news source within the world news category of the generic play list, while a building B may choose Reuters as the world news source within that category, and a building C may select CNN, New York Times, and Reuters as their world news sources. This approach allows maximum flexibility to the building owner/manager while requiring very little additional overhead at the production center 320.

An example of a format for the content mapping file is shown below in Table V.

TABLE V

<category>,<information path>,<refresh cycle>
world_news,ftp::/cnn.com/captivatenetwork/news,4320
world_news,ftp::/reuters.com/captivatenetwork/worldnews,4320
weather,ftp::/captivatenetwork.com/weather/boston,40
national_news,http::/boston.com/captivatenetwork/news,1440

The first element of the content mapping file 329 shown in Table V, <category>, identifies the category in the generic play list being mapped. For the example above, the first line indicates a single mapping to the world news category, world_news. However, any given category is not limited to a single mapping, and may include multiple mappings. The second element, <information path>, identifies the information path, which is the mapping performed by the content mapping file 329. During the content retrieval process described below, the building server 328 will use the information path designation to make an FTP or HTTP request to retrieve an actual file or files for the data source in the specified category. The last component of the content mapping file 329, <refresh cycle>, signifies the assignment of date information to a particular file or category. For example, a stale data time designation defines, in minutes, how often the data in a category needs to be refreshed before the server marks it as stale.

In the example of Table V the content mapping file 329 is illustrated as a file, but the content mapping file may actually not be a file at all. If a Windows NT based server is used, the content mapping file could actually be a series of registry keys manipulated by the building server service. The content mapping file may also include information in a text or configuration file.

In addition, the content mapping file concept may optionally be included in the generic play list. A sample file format for this case is as follows:

Segment, category, information path, refresh cycle

However, the separation of these data enhances flexibility and simplifies the content development process.

In the present application, the content mapping file 329 will be assumed to be a file with the format described above.

Content Retrieval

With the content mapping file 329, the building server 328 has the information needed to retrieve the files necessary for building the local play list 368. The generic play list 321 sent from the production center 320 does not define any specific files referencing source information or where they are placed. Instead, a slot in the generic play list 321 defines only the category of information. The building server 328 chooses from a source directory 327 in the content mapping file 329 which file is played in that slot based on a continuously repeating series (round robin) pick of all the available files in the source directory 327 for that category.

Figure 20:
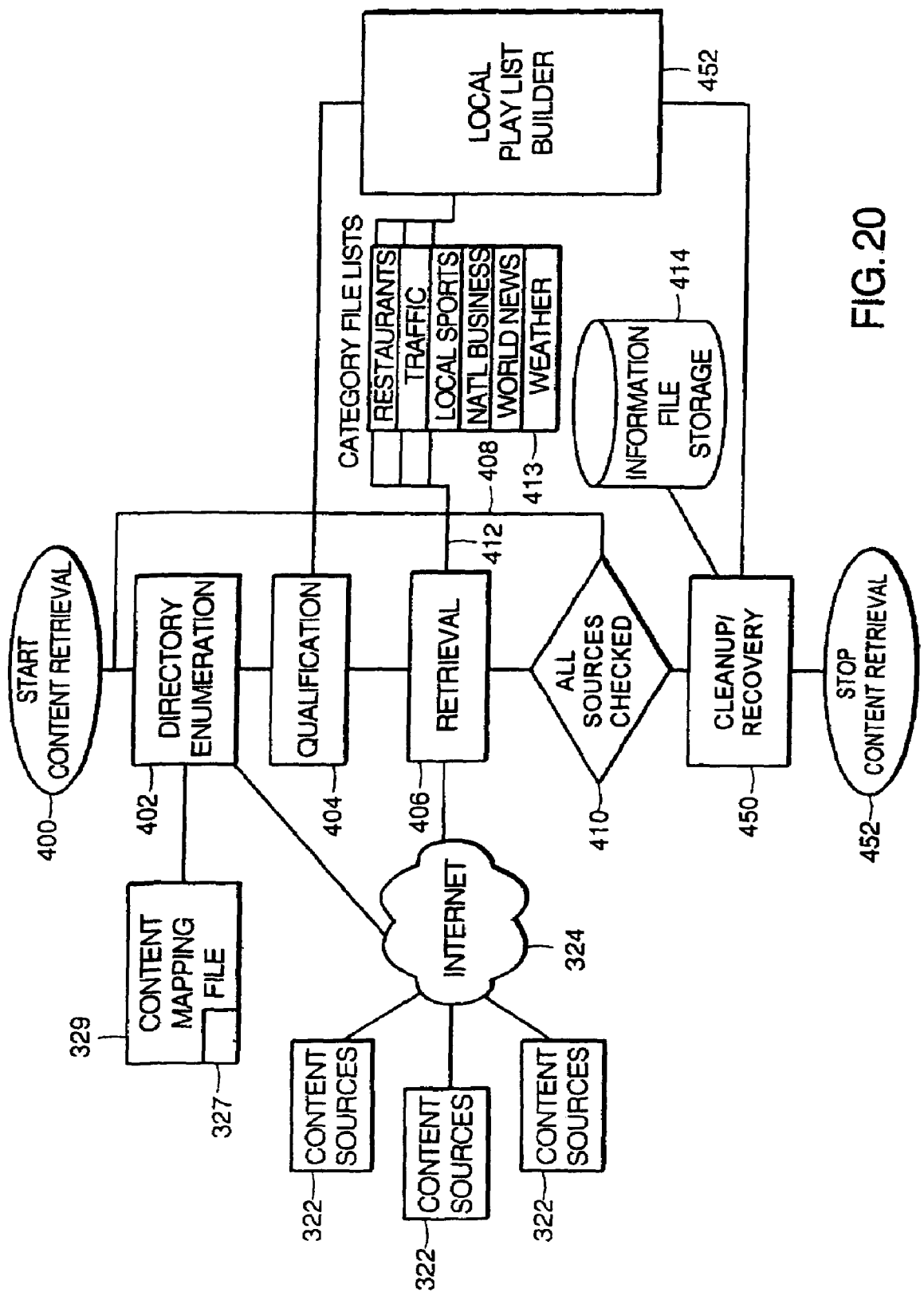
FIG. 20 is a functional block diagram of the content retrieval procedure of the method of the present invention.

The round robin selection is based on category file lists built and maintained during the content retrieval process 400 illustrated in FIG. 20. This content retrieval process includes three principal steps: directory enumeration, qualification, and retrieval.

In the directory enumeration step 400, the building server 328 (See FIG. 19) identifies what files are located in a source directory 327 in the content mapping file 329, and when the identified files were last modified. The building server 328 uses the path information specified in the content mapping file 329 to sample the contents of each source directory 327. The file names and modification dates for each file in the source directory are extracted and supplied to the qualification step 404.

In the qualification step 404, the building server 328 determines whether a file identified in the enumeration step 402 is a candidate for retrieval. Qualification for retrieval requires that the identified file either: (1) does not currently exist on the local building server 328; or (2) if the identified file does exist on the local building server 328, the identified file has a modification date that is earlier than the file in the source directory 327.

Another important aspect of the qualification step 404 is the determination whether the local play list needs to be re-generated. The local play list must be regenerated if the qualification process determines that the file being retrieved is new. Updates of an existing file do not require re-generation of the local play list.

If the file qualifies for retrieval, the file is retrieved and downloaded in the file retrieval step 406, which is explained in detail below.

File Download, File Validation, and List Update

The content retrieval process 406 includes a file download step 408, a file validation step 410, and a list update cycle 412. The download step 408 brings the information files to the local building server 328 (See FIG. 19). The file validation step 410 insures the integrity of the data brought to the building server 328. The category file list update process 412 manipulates the category file lists 413 to reflect changes associated with the downloaded data.

File Download

Depending on the transfer protocol specified by the content mapping file 329, the file download is performed by either an FTP fetch or an HTTP get operation. The file is downloaded to a TEMP directory in an information file storage area 414 on the building server 328. Once the transfer is complete, the file validation process 410 can be performed.

File Validation and Extraction

Each file transferred during the file download step 408 is encapsulated within a protocol header. The protocol header represents a communication mechanism with multiple levels of functionality designed to enhance programming flexibility. The protocol header may be designed to, for example, ensure data integrity, provide network security, and activate or deactivate files at the server. An example of a file header format is shown below in Table VI.

TABLE VI

Security ID
Number of Files
File List
Checksum

Figure 21:
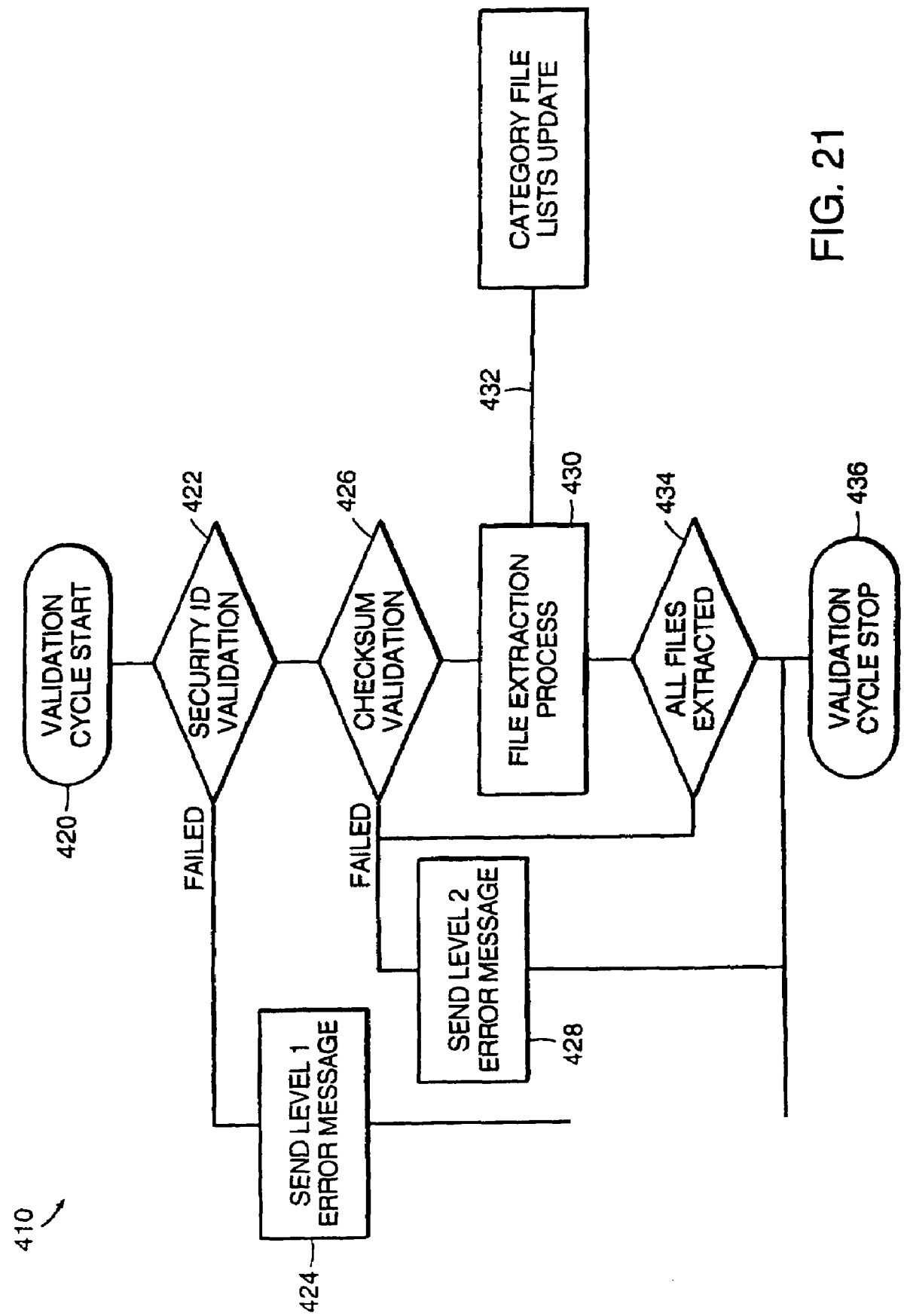
FIG. 21 is a flow diagram illustrating the validation procedure in the method of the present invention.

The security identification (ID) in the protocol header of Table VI provides a level of network security for file transfers. Referring to FIG. 21, following an initiation step 420, the first step 422 in the validation cycle 410 is to verify the security ID. The security ID is calculated by performing an exclusive OR (XOR) function with the File Size, Checksum, and a key value. The key value is defined by a registry key on the building server 329 and is common with the program that develops the protocol header of Table VI. The inability to validate a security ID for any given file represents a potentially serious security risk.

If the security ID cannot be validated, the building server 329 will send a level one error message in step 424, through logging, back to the network operations center (NOC) 325 (See FIG. 19) for immediate investigation. The next level of validation is performed at step 426 using the checksum. The program that develops the protocol header of Table 6 calculates the checksum. The building server 329 will calculate its own checksum based on the received file and verify the two values match. If they do not match, the building server will terminate the retrieval process and send a level 2 error message in step 428, through logging, back to the NOC 325 for investigation.

If the file is validated, the file information is extracted (step 430) and placed in a FRAMES directory in the building server 329 (step 432). Once all files are extracted (step 434), the validation cycle ends (step 436).

The protocol header of Table 6 may also allow multiple files to be placed within the protocol. This arrangement provides tremendous flexibility by allowing the building server 329 to capture multiple sources of information and develop the local play list 368 from the generic play list 321 (See FIG. 19). Unfortunately, the placement of the multiple retrieved files is random, meaning one file is not guaranteed to appear next to another. The multi-file protocol allows retrieved files to be placed next to each other in the play list. The protocol operates as shown in Table VII:

TABLE VII

If Number of Retrieved Files is greater than 1, then
Extract each file individually and mark them as a bundle
else
If Number of Retrieved Files is equal to 1
Extract the file and mark it as a single entry
End While not exemplified in the protocol header discussed above, the protocol header may be extended to include activation and deactivation times for each file. Once a file is transmitted to the server, the activation/deactivation elements in the header allow the building processor to control the start and end times for each file so that files in the same information category may run at different times during the day. This expansion of the role of the building processor provides great flexibility and simplified file management at the network operations center 325.

Category File List Update

Following the source check in step 410, the category file lists 413 are updated in step 412. The category file lists 413 hold pointers to the files that make up each content category. Instead of subdividing the directory structure in the building server 329 into separate content categories, it is far more efficient and useful to keep the file structure flat and use lists to manage the data. The structure of the category file lists is shown below in Table VIII.

TABLE VIII

Category
File
    Modification Date
    File Present Flag
    Bundle flag
    Stale flag In the structure in Table VIII, the category maps to the category element in the content mapping file 329 (See FIG. 20 and Table V). The file field represents the file names extracted from the source directories. The last modification date and stale flag are important for the stale data recovery algorithm, which is described below. The file present flag indicates whether the file was still present in the source directory during the last content retrieval cycle. This is important for the cleanup process. Finally, the bundle flag is used to force files to be placed in succession within the local play list. The bundle flag is actually an alphanumeric value having the following possible states shown in Table IX:

TABLE IX

Off - The file is not a part of a bundle
Start - This is the first file in a bundle
Element - This is one of the middle files in the bundle
End - This is the last file in the bundle As with the protocol header discussed above, the category file list definitions may also be expanded to include an activation or deactivation time to transfer file run time control fully or partially from the network operations center to the building processor. This enhances programming flexibility.

The process 412 (See FIG. 20) for updating the category file lists 413 consists of category creation, file insertion, and file maintenance steps.

Category Creation and Removal

Figure 22:
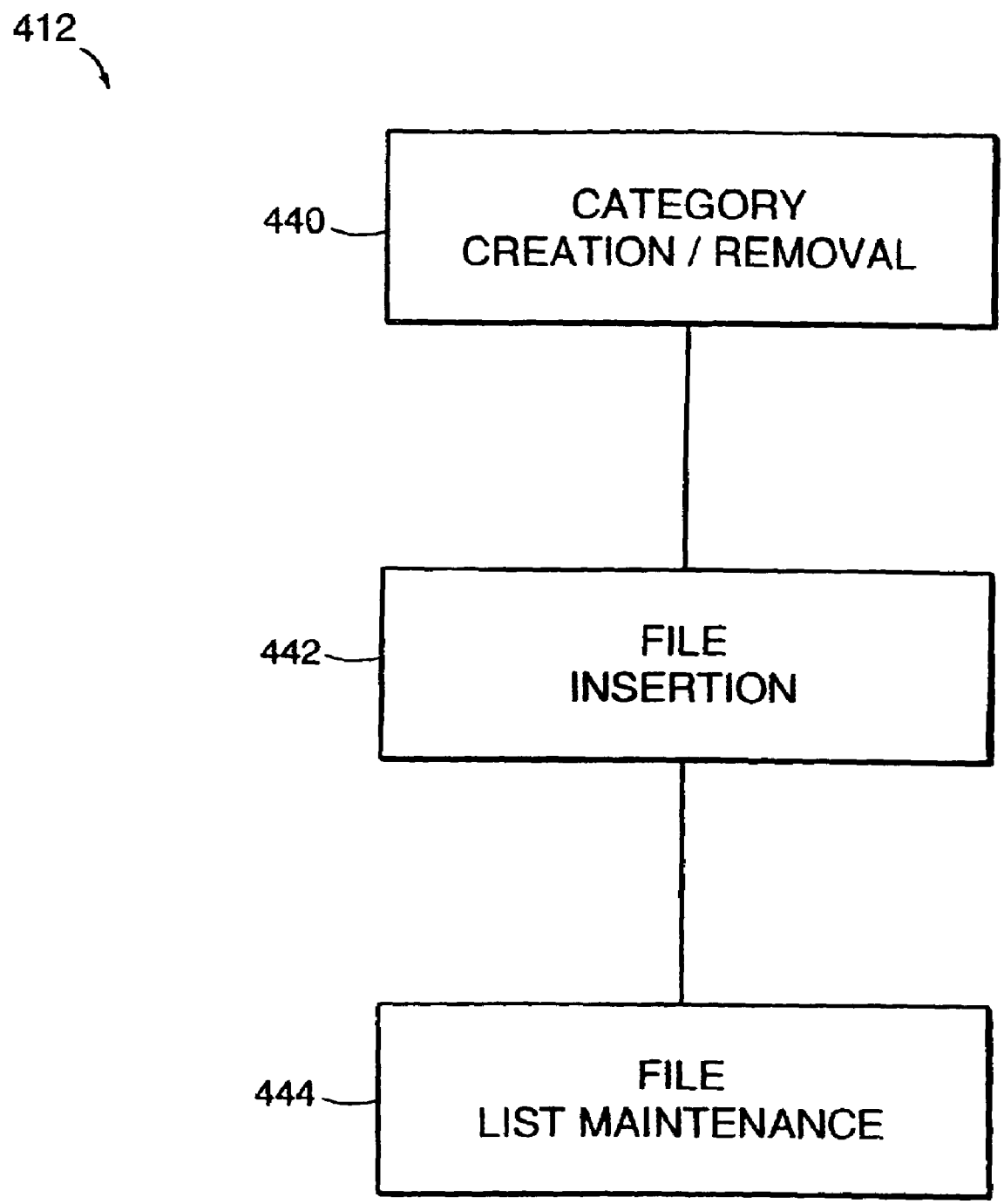
FIG. 22 is a flow diagram illustrating the file update procedure of the method of the present invention.

A category file list must exist for each category defined in the content mapping file 329. Therefore, referring to FIG. 22, the first element 440 in the update process 412 is the category creation and removal procedure. During the category creation and removal procedure 440, the building server 328 will interrogate the content mapping file 329 and add any category file lists 413 that are not present or delete any category file lists 413 that are present, but not defined in the content mapping file 329.

File Insertion

As the retrieval process 406 enumerates each source directory and qualifies the files, any file that is not present on the building server 328 must be retrieved and validated and then placed in a category file list 413. The retrieval and validation process considers two elements: (1) does the file exist in the FRAMES directory on the server 328; and, (2) is it in the category file list 413. If the file exists in the FRAMES directory on the server 328, it will not be retrieved. However, if the file is not in the category file list 413 it must be inserted. Specifically, if the file is not in the FRAMES directory on the server 328, the file will be retrieved, validated and then inserted into the category file list in step 442. The category file lists are ring buffers, therefore, the new file is added to the end of the list. The building server will then capture the modification date, set the present flag, and mark the bundle flag appropriately.

File Maintenance

During the retrieval and qualification steps 406, 410, if it is determined that a file has been modified or is unchanged, then a category file list maintenance event 444 must take place. The maintenance activity 444 considers the elements of the category file list: the modification date, the stale flag, and the file present flag. These flags are used by the cleanup and recovery functions at step 450, which is described below. Each time a file is modified, the building server 328 must update the modification date, clear the stale flag, and mark the file present flag to indicate the file is still valid. For unchanged files, the building server 328 will simply mark the file as present.

Cleanup and Recovery

Cleanup and recovery are important elements of the content management process. Referring again to FIG. 20, the cleanup and recovery process 450 insures that files, which are no longer active in the play list, are removed from the FRAMES directory in the building server 328. This keeps the FRAMES directory from growing out of control during the course of weeks and months of operation.

The cleanup portion of the process 450 requires examination of the file present flag for every file in each category file list. If the file is not set, the file is deleted from the frames directory and the category file list, and the local play list is rebuilt at step 452. If the file present flag is set, the flag is removed in preparation for the next content retrieval cycle.

The recovery portion of the step 450 is used to manage stale data. Each category of information has a refresh cycle (See Table 5 above). Stale data occurs when the modification date for a file exceeds the refresh rate for that category. Following the content retrieval and cleanup steps 406, 410, recovery is performed on each file in the category file lists. If a file is found to be stale, the building server 328 will set the stale flag for the given file, and rebuild the local play list at step 452. The stale flag is reviewed during the local play list development process to determine whether the file is included in the local play list. The building server 328 may also generate a level 2 error, through logging, to alert the NOC of the situation (not shown in FIG. 20). Once the file is updated and meets the refresh requirements for the category, it can again be placed in the local play list. The power of this stale data recovery algorithm is that it insures the local play list can self heal if the building server 328 loses communication with the Internet.

Once the cleanup and recovery step 450 has concluded, the content retrieval process ends at step 452.

Local Play List Development

Figure 23:
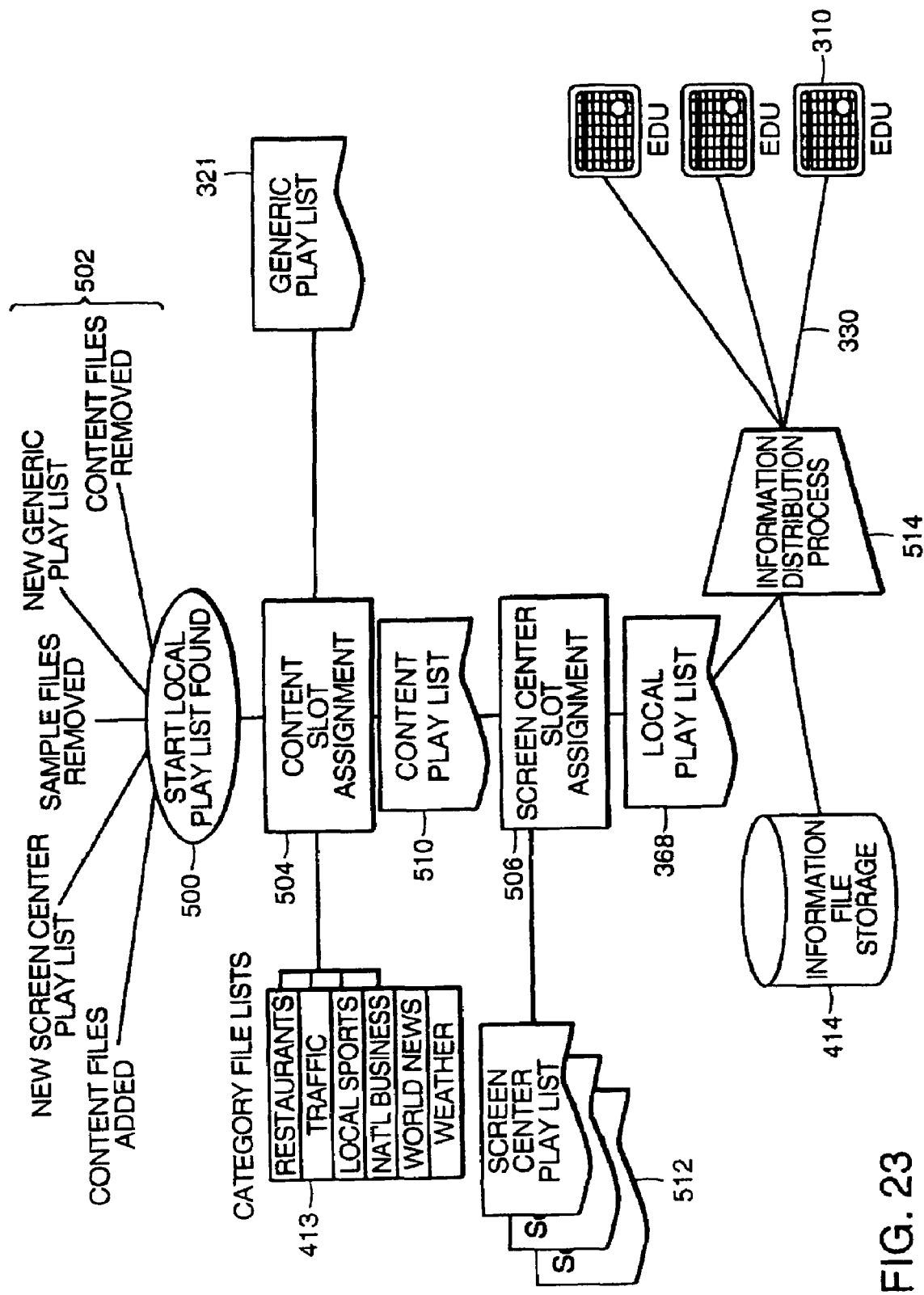
FIG. 23 is a functional block diagram of the local play list development procedure of the method of the present invention.

Referring to FIG. 23, local play list development 500 is the process in which the generic play list is made into the building specific local play list. Marrying the category file lists with the generic play list, and then incorporating screen center messages from the building play list performs the transformation.

There are a number of triggering events 502 that can initiate the development of the local play list 368. Examples include addition of a content file, a new building play list for screen center messages, a new generic play list, content file removal, and stale file removal. Once the local play list development process 500 is triggered it performs a two step operation. First, the generic play list is converted to a content play list via the content slot assignment process 504. The content play list is then transformed into the local play list by the screen center slot assignment function 506.

Content Slot Assignment

Figure 24:
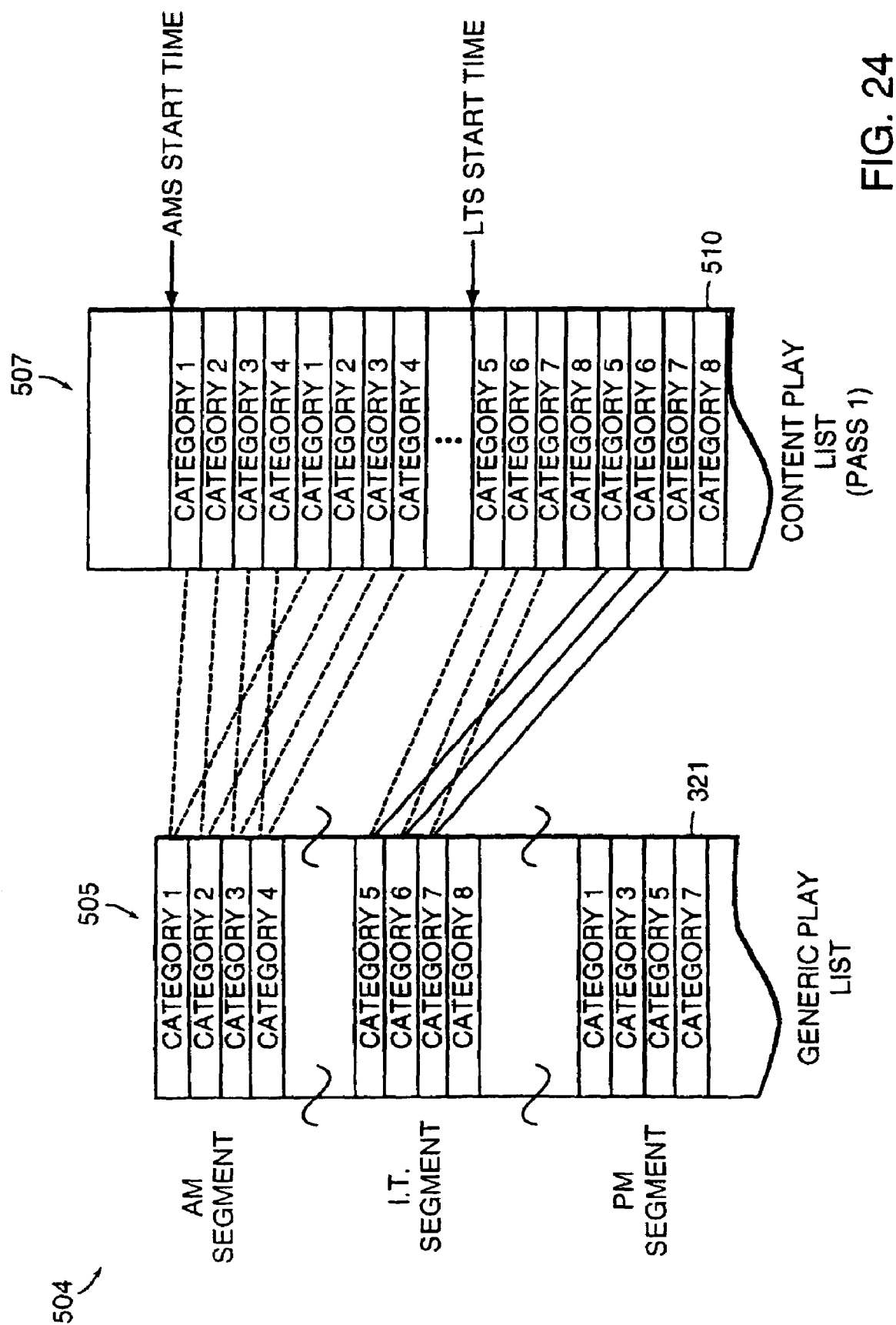
FIG. 24 is an illustration of the generic play list expansion procedure in the process of the present invention.

Content slots are assigned in step 504 by expanding the generic play list 321 to fit the entire 24 hour day and then placing content by category in a round robin fashion. Referring to FIG. 24, this is done in two passes to create the first pass of the content play list. First, the generic play list 321 is expanded at step 505. This expansion rotates the category assignments in the category file lists 413 into a segmented 24-hour period with an AM segment, an LT segment, and a PM segment. Second, the category definitions within the generic play list 321 are simply repeated in step 507, on a per-segment basis, to fill each 10-second time slot within the content play list. Once the generic play list is expanded to the full day, the first pass of the content play list 510 is complete and the process of inserting the content files can be performed.

Replacing the generic content assignments with real content file names is done using the category file lists 413. The fill process step is performed in a round robin fashion using the algorithm shown in Table X below.

TABLE X

Start at time 00:00:00 in content play list
Step 1: Locate category file list for category specified in
content play list
IF category file list is empty
    Remove slot in content play list
Else
IF stale flag not set for current file in category file list
    Replace category name in content play list
    If bundle flag = start
        Continue to add the files from category file
        list to the
content play list until the bundle flag = end is found
        Endif
    Else
        Find the next file entry in the list that is not marked
        as stale and
insert this file name into content play list. If all files are
marked stale in the category,
  then remove the category from content play
  list.
        Endif
    Endif
    If not end of content play list
        Goto to next entry in content play list and repeat
        step 1
    Endif If activation and deactivation times are used, the algorithm in Table X above would be modified to include a test on each file to verify that the current time falls within the activation and deactivation times of the candidate files within the category file list.

The algorithm described in Table X will create the content play list 510. This play list is then modified in the screen center slot assignment step 506 to include the building owner-manager (BOM) play list 512 messages to produce the local building play list 368. Using the local building play list, video information is distributed at step 514 by the building server via the building LAN 330 to the elevator display units 310.

Still further embodiments are within the claims.

What is claimed is:

1. A method for displaying an image on a plurality of displays, each display being in one of a plurality of elevator cabs, the method comprising:
   inspecting a playlist that includes:
      category information identifying a plurality of categories of information to be displayed,
      a first pointer leading to information classified in a first category,
      a second pointer leading to information classified in a second category that differs from the first category, and
      first data leading to first information to be displayed;
   on the basis of the first data, retrieving the first information;
   assembling second data, the second data being representative of the image that includes the first information; and
   distributing the image to each display.

2. The method of claim 1, wherein inspecting the playlist comprises determining, on the basis of the first data, an address from which the first information is to be retrieved.

3. The method of claim 1, wherein assembling second data comprises merging the first information with second information to be displayed concurrently with the first information.

4. The method of claim 3, further comprising selecting the first information to be an advertisement and the second information to be real time general information.

5. The method of claim 1, further comprising selecting a playlist on the basis of demographic information.

6. The method of claim 1, wherein the first data comprises a pointer to an internet address.

7. The method of claim 1, wherein the first data comprises a pointer to data stored in a local area network.

8. The method of claim 1, further comprising inspecting third data indicating when the first information is to be displayed, and wherein providing the image to each display comprises providing the image at a time consistent with the third data.

9. The method of claim 1, further comprising locally caching the first information.

10. The method of claim 9, wherein locally caching the information comprises caching the information in a building server.

11. The method of claim 1, wherein the first data comprises category information identifying a category to which the first information belongs.

12. A method for displaying an image on a display in an elevator cab, the method comprising:
   inspecting a playlist that includes:
      category information identifying a plurality of categories of information to be displayed,
      a first pointer leading to information classified in a first category,
      a second pointer leading to information classified in a second category that differs from the first category, and
      first data leading to first information to be displayed; and
   on the basis of the first data, retrieving the first information for display in the elevator cab.

13. The method of claim 12, further comprising assembling second data, the second data being representative of an image that includes the first information.

14. The method of claim 13, further comprising sending the image to the display.

15. The method of claim 14, wherein sending the image to the display comprises selecting the display from among a plurality of displays in a corresponding plurality of elevator cabs, and sending the image from a building server to the selected display.

16. The method of claim 13, wherein assembling second data comprises merging the first information with second information to be displayed concurrently with the first information.

17. The method of claim 16, further comprising selecting the first information to be an advertisement and the second information to be real time general information.

18. The method of claim 12, wherein inspecting the playlist comprises determining, on the basis of the first data, an address from which the first information is to be retrieved.

19. The method of claim 12, further comprising selecting a playlist on the basis of demographic information.

20. The method of claim 12, wherein the first data comprises a pointer to an internet address.

21. The method of claim 12, wherein the first data comprises a pointer to data stored in a local area network.

22. The method of claim 12, further comprising inspecting scheduling data indicating when the first information is to be displayed, and wherein providing the image to each display comprises providing the image at a time consistent with the scheduling data.

23. The method of claim 12, further comprising locally caching the first information.

24. The method of claim 23, wherein locally caching the information comprises caching the information in a building server.

25. The method of claim 12, wherein the first data comprises category information identifying a category to which the first information belongs.

26. A computer-readable medium having encoded thereon software for displaying an image on a plurality of displays, each display being in one of a plurality of elevator cabs, the software comprising instructions for:
   inspecting a playlist that includes:
      category information identifying a plurality of categories of information to be displayed,
      a first pointer leading to information classified in a first category,
      a second pointer leading to information classified in a second category that differs from the first category, and
      first data leading to first information to be displayed;
   on the basis of the first data, retrieving the first information;
   assembling second data, the second data being representative of the image that includes the first information; and
   distributing the image to each display.

27. The computer-readable medium of claim 26, wherein the instructions for inspecting the playlist comprise instructions for determining, on the basis of the first data, an address from which the first information is to be retrieved.

28. The computer-readable medium of claim 26, wherein the software further comprises instruction for inspecting third data indicating when the first information is to be displayed, and wherein instructions for providing the image to each display comprise instructions for providing the image at a time consistent with the third data.

29. A computer-readable medium having encoded thereon software for displaying an image on a display in an elevator cab, the software comprising instructions for:

inspecting a playlist having:
  category information identifying a plurality of categories of information to be displayed, and
  a first pointer leading to information classified in a first category,
  a second pointer leading to information classified in a second category that differs from the first category, and
  first data leading to first information to be displayed; and on the basis of the first data, retrieving the first information for display in the elevator cab.

* * * * *

UNITED STATES PATENT AND TRADEMARK OFFICE
CERTIFICATE OF CORRECTION

PATENT NO. : 7,278,518 B2  Page 1 of 1
APPLICATION NO. : 10/800107
DATED : October 9, 2007
INVENTOR(S) : Todd A Newville and Shawn W. Duarte It is certified that error appears in the above-identified patent and that said Letters Patent is hereby corrected as shown below:

On The Title Page,
Please insert the following paragraph

Item
(73) Assignee: Gannett Satellite Information Network, Inc., McLean, Virginia (US)

Signed and Sealed this

Eighteenth Day of December, 2007

JON W. DUDAS
*Director of the United States Patent and Trademark Office*